United States Patent [19]
Knapp

[11] Patent Number: 5,301,974
[45] Date of Patent: * Apr. 12, 1994

[54] BICYCLE SUSPENSION SYSTEM

[75] Inventor: Thomas D. Knapp, Kent, Ohio

[73] Assignee: Knapp Engineering, Kent, Ohio

[ * ] Notice: The portion of the term of this patent subsequent to Sep. 3, 2008 has been disclaimed.

[21] Appl. No.: 753,839

[22] Filed: Sep. 3, 1991

Related U.S. Application Data

[63] Continuation-in-part of Ser. No. 340,088, Apr. 18, 1989, Pat. No. 5,044,648.

[51] Int. Cl.$^5$ .............. B62K 19/36; B62K 21/20; F16F 9/36; F16F 11/00
[52] U.S. Cl. .................. 280/283; 188/322.17; 248/622; 248/631; 267/221; 267/226; 280/276
[58] Field of Search ............. 280/283, , 275, 276, 280/277, 279, 280; 188/322.17, 322.16; 248/622, 631; 267/217, 227, 226

[56] References Cited

U.S. PATENT DOCUMENTS 5,044,648 9/1991 Knapp .................. 280/283

Primary Examiner—Mitchell J. Hill
Attorney, Agent, or Firm—Oldham, Oldham & Wilson

[57] ABSTRACT

The invention comprises a system for a bicycle or similar vehicle to allow shock isolation at the location of the seat or handle bar mounting or other locations. The suspension system includes a hydraulically actuated system as well as a variable rate progressive dampening assembly. The hydraulic fluid is also utilized to lubricate the moving portions of the system to promote proper function and extend the useful life thereof. The system also has a variable spring preload to accommodate different sized riders. The system is cost effective and yet extremely durable and may be retrofit for use with existing bicycles.

37 Claims, 19 Drawing Sheets

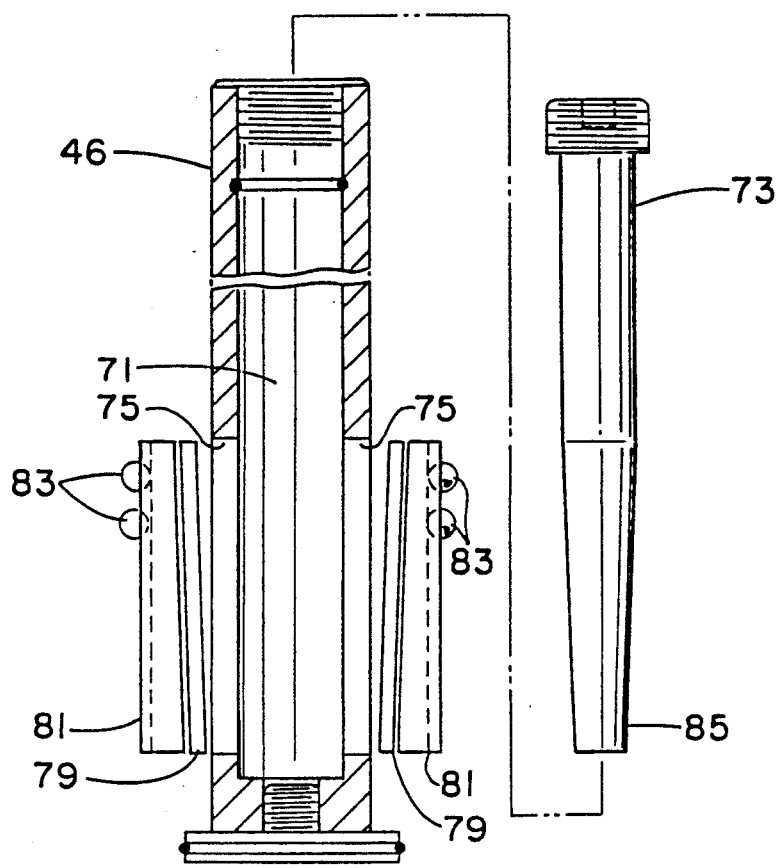
FIG.-5B
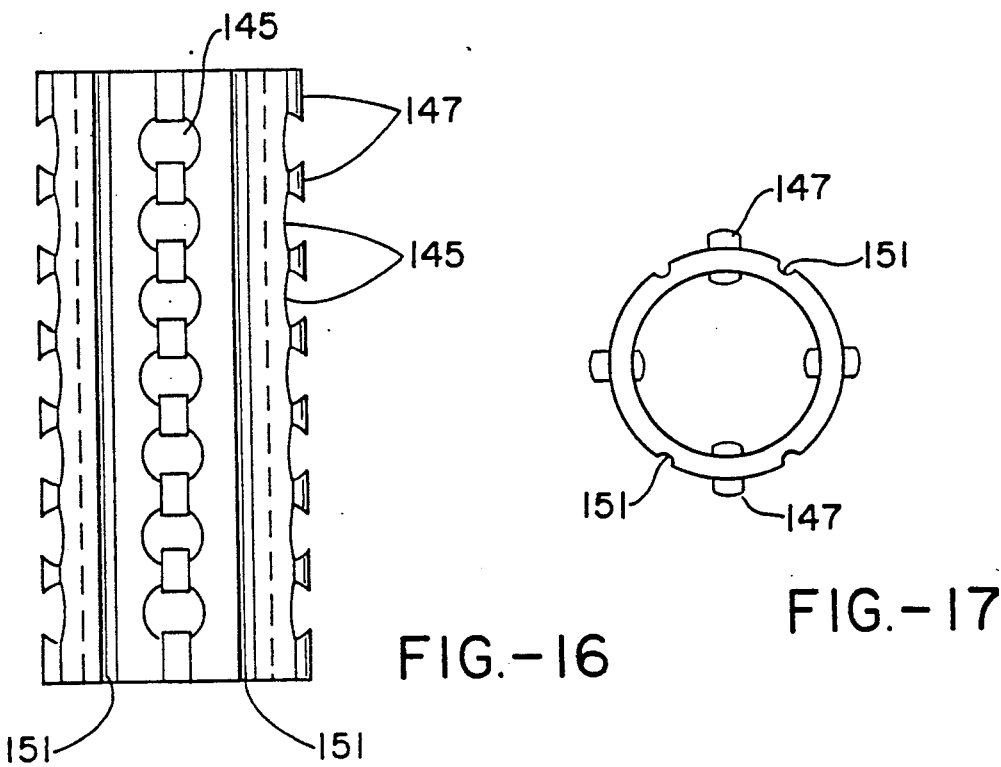
FIG.-16
FIG.-17

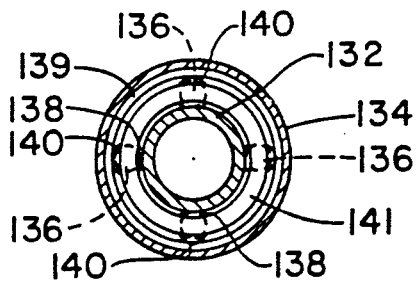
FIG.—10
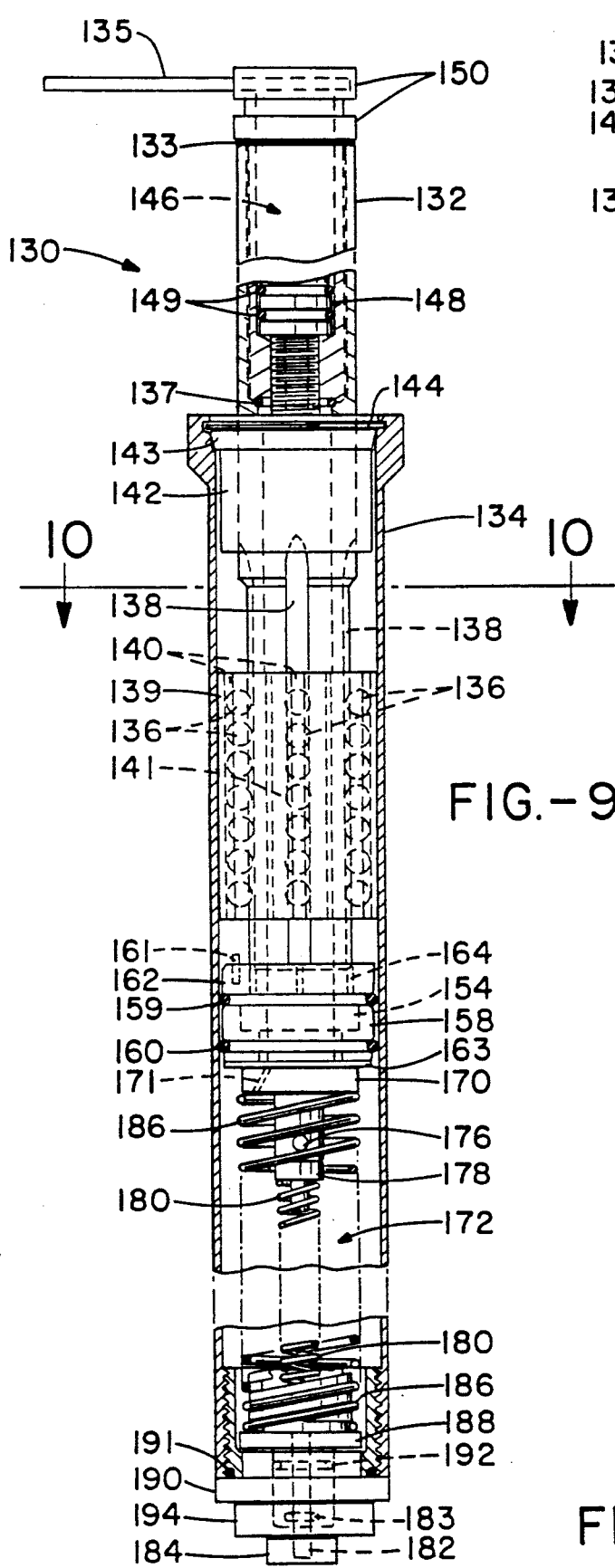
FIG.—9
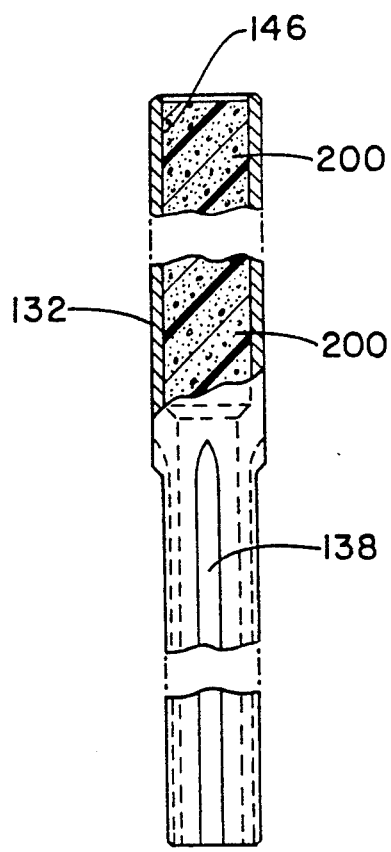
FIG.—15

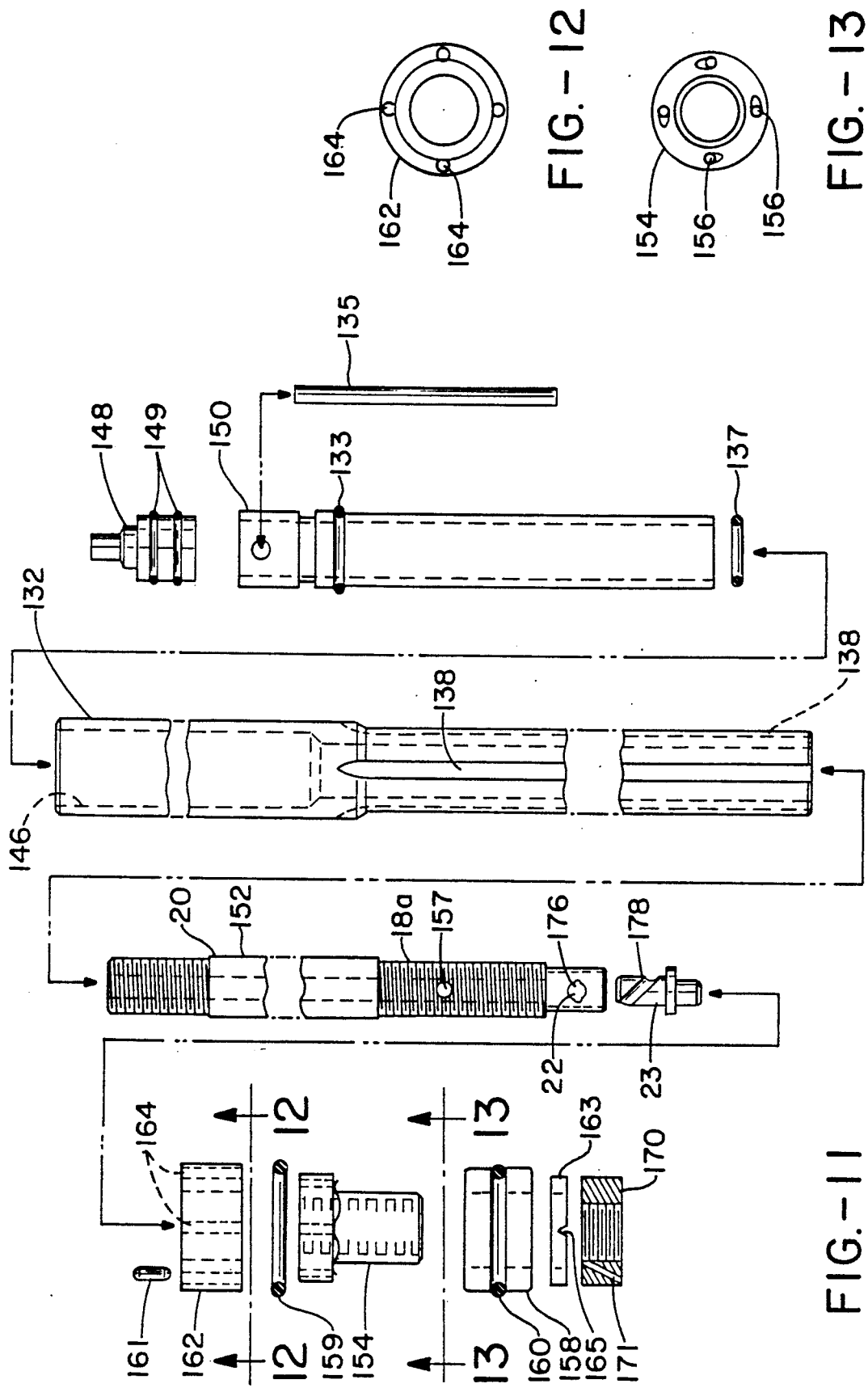

BICYCLE SUSPENSION SYSTEM

This application ia a continuation-in-part of application Ser. No. 07/340,088 filed Apr. 18, 1989 and issued as U.S. Pat. No. 5,044,648.

BACKGROUND OF THE INVENTION

This invention relates to a suspension system for a bicycle or the like to improve the riding comfort thereof. More particularly, the invention relates to a shock absorbing system for use at the seat, front forks, frame or other location on a bicycle to form a suspension system to dampen shocks incurred during riding.

The comfort of the ride on bicycles or other similar vehicles has escalated in importance as the popularity and use of such vehicles has expanded. For example, bicycles are now manufactured which are known as mountain bikes or ATB's (All Terrain Bicycle) which are constructed to be used in off-road environments. In these particular situations, the comfort of the ride is particularly important. The comfort is also important with road use of bicycles as the length of the ride is usually significantly longer.

A variety of suspension systems have been developed for bicycles or the like. These include shock absorbing means coupled with the frame of the bicycle and to the wheels thereof so as to absorb shocks imposed on the wheels during riding. These systems usually provide relative movement between the wheels and the frame of the bicycle.

Other proposed systems to isolate shocks imposed on bicycles and similar vehicles have included the mounting of coil springs onto the bottom of the seat on which the rider rests or to the seat frame to cushion shock to some degree. Other systems provide relative movement between the seat of the bicycle on which the rider will be supported and the frame of the bicycle, to thereby absorb shocks imposed on the bicycle and to provide a smoother ride. In such systems, disadvantages have been found to exist in that exposure to the atmosphere subjects the apparatus to corrosion which will limit the life expectancy and functioning of the apparatus. Similarly, attempts to limit rotation of the shock absorbing posts in such apparatus include structure which is also exposed to the environment and may gather dirt or other debris, thereby inhibiting shock absorbing capabilities. It has also been found that the device has no dampening means by which the rider can vary the amount of dampening provided by the system and are therefore not be effective over a wide range of riders which may utilize the system and over a broad range of road or off-road conditions. Alternatively, some suspension designs include relatively complex toggle systems to yield relative movement between the wheels of the bicycle and the frame. These systems have not provided the performance characteristics desired.

The various designs have been found to be disadvantageous for various reasons such as binding or restricted movement due to non-lubrication, exposure to atmospheric conditions, lack of adjustability or flexibility in the control of the shock absorber characteristics. Other problems with prior art suspension systems are found in the strength and durability of the systems in use with bicycles or the like. For example, a shock isolation system adapted to mount the seat or front forks of the bicycle thereon is subjected to various loading including lateral loading which imposes structural requirements to meet such loads. In attempting to provide the structural strength in the shock absorbing system, the weight of the shock absorbing system has proved to be prohibitive in view of the strong emphasis placed upon decreasing the weight of the bicycle. At the location of the front forks, it is imperative that the structural integrity of the shock isolation system be maintained, while not increasing the weight of the bicycle to any great degree. Various prior art systems which have been developed for use at the front fork location of the bicycle have not provided a great deal of shock absorbing capabilities, or have been complex and generally ineffective.

SUMMARY OF THE INVENTION

Based upon the disadvantages found in the prior art, it is accordingly a main object of this invention to provide a bicycle suspension system which may be utilized to effectively provide shock isolation at various positions of a bicycle such as the mounting of the seat, the front forks and wheel of the bicycle, or in other advantageous locations so as to efficiently isolate shocks imposed on the bicycle and provide a more comfortable ride.

It is another object of the invention to provide a device which is of compact and lightweight design to be utilized, and yet provides structural integrity with the modern mountain and street bicycles in a variety of conditions and for any riders.

It is yet another object of the invention to provide a suspension device which is enclosed and sealed, having only one external moving post attached directly to a seat, the bicycles front forks, or other location to provide the suspension thereto. In this way, atmosphere exposure of the suspension system will be prevented thereby extending the useful and functional life of the system, Also, the suspension device can be used in a variety of orientations or mounting positions as desired.

A further object of the invention is to provide a shock isolation system and suspension device which may be configured to allow mounting of the seat or front forks of the bicycle thereto. The suspension device provides a great amount of control and flexibility over the suspension characteristics by maintaining the desired structural integrity and lightweight construction desired.

Another object of the invention is to provide a suspension system which may be mounted in essentially any orientation without effecting dampening characteristics or smooth reciprocal motion of an extending piston post to which a portion of the bicycle is mounted.

A further object of the invention is to provide a suspension system which includes means for external adjustment to control bias pressure and dampening functions while operating the bicycle, wherein such control means are mounted in one or more easily accessible locations to a rider while riding the bicycle.

It is a further object of the invention to provide a suspension system which allows for adjustment of the preload to bearings means provided in the system so as to allow simple bearing pressure or bearing tolerance alterations by simple external adjustment controls.

Another object of the invention is to provide a suspension system to increase or maintain rigid characteristics of a standard bicycle frame by means of a non-rotation bearing assembly to reduce lateral and longitudinal flex in operation of the bicycle.

Yet another object of the invention is to show a suspension system which may use alternative lubrication systems for internal moving components or self-lubricating materials where no such lubrication is necessary.

Yet another object of the invention is to provide a suspension system which may be incorporated at various locations on the frame of a bicycle to form a fully suspended bicycle frame which may be retrofit or incorporated at the OEM stage with main frame alterations to enhance effectiveness of such combined systems.

Another object of the invention is to provide direct lubrication to the moveable portions of the suspension system to reduce wear and binding of these portions for proper and extended functioning thereof.

A further object of the invention is to provide a variable dampening function to yield a smooth and comfortable ride on road or off-road surfaces which will be effective in both pedaling and coasting modes of riding.

It is yet another object of the invention to provide control of the resiliency of a spring means associated with the suspension system without diminishing the travel associated with the suspension system to thereby be adjustable for a broad range of riders and maintain equivalent operating characteristics.

It is a further object of the invention to provide a suspension system which is designed to be a non-rotating system, thereby affording a range of movement in one directional plane only. Alternatively, the design is adjustable to provide limited additional movement in a second directional plane to thereby gain additional advantages which may be desirable in some circumstances.

These and other objects of the invention are accomplished by a suspension system for a bicycle or other vehicle having a main frame, wherein the shock isolation system comprises an outer housing secured to the main frame of the bicycle, and a piston having a head and body portion adapted to be positioned within the outer housing in slidable relation thereto. The piston body portion is adapted to be slidably disposed within the outer housing with a portion of the piston body extending outwardly from the housing for mounting to a portion of the bicycle. The piston body includes first guide means formed therein, which in the preferred embodiment comprises one or more longitudinally extending grooves formed in the piston body or within an insert forming part of the piston body. The outer housing includes second guide means adapted to co-act with the first guide means of the piston body to house bearing means which are retained within the guide means in the outer housing. In this way, the piston body is allowed at least relative linear motion with respect to the outer housing in smooth, essentially frictionless motion to provide shock isolation. The first and second guide means in conjunction with the bearing means also limits rotational movement of the piston body relative to the outer housing as such rotation would render the shock isolation system unusable for the application to portions of a bicycle or similar vehicle. A biasing means is provided to act upon the piston of the suspension device, and a variable rate dampening configuration facilitates isolation of shock imposed on the wheels or frame of the bicycle while not impairing ridability thereof.

The outer housing of the suspension device may be sealed about the outwardly extending piston body portion and means are provided within the outer housing for lubricating the bearing and guide means structure to allow smooth and effective shock isolation. The variable rate dampening system of the device along with the ability to adjust preload and other aspects of the suspension characteristics allow for a great amount of flexibility and adaptability to particular riding conditions. The suspension system may be mounted in conjunction with the frame of a bicycle to provide a suspended non-rotation or limited rotation mounting structure for a seat, front forks or other portion of the bicycle or other vehicle. The suspension system can be adapted to many types of vehicles such as unicycles, bicycles, tricycles or the like. Also, the suspension system may be utilized with a sub-frame and toggle link assembly for relative movement between the main frame of the bicycle.

The suspension devices which will be shown in more detail as the description proceeds includes several embodiments. In all of the embodiments, a single shock absorbing post is adapted to extend from the suspension device for mounting to a portion of the bicycle. The ability to mount the post in any position for a desired application renders the system very flexible and conveniently used in a variety of positions. For example, in a seat post arrangement, the single shock absorbing post extends substantially vertically upright, wherein for steering suspension at the front fork location of the bicycle, the shock post is inverted substantially vertically, or in a sub-frame system, the shock post may be mounted substantially horizontally. The ability to mount the suspension device in these variety of positions is due in part to the hydraulic system and a bladder/accumulator system forming part of one embodiment of the suspension device. This design eliminates erratic movement of the piston post and allows a broad range of working characteristics to allow proper functioning of the device in the variety of embodiments and positions on a bicycle. Alternatively, friction dampening may be provided either alone or in conjunction with a hydraulic system. In another aspect, a low friction bearing alignment system common to all embodiments allows a great amount of versatility and flexibility in achieving desired suspension characteristics. The low friction bearing alignment system allows the use of the single shock post verses more conventional double shock post systems. The low friction bearing alignment system in conjunction with the variable rate dampening and other aspects of the suspension device provide for strong and smooth operation under heavy side loads which may be induced at different mounting angles and positions of the device.

The suspension system of the invention provides a device to enhance rider comfort and safety in bicycles and other vehicles in all types of riding situations. The system transfers the side or lateral loads imposed on the seat, front forks or other portions of the bike to the bearing guides to accommodate these loads. The suspension system provides a very cost effective and yet extremely durable device, while maintaining a lightweight and adjustable configuration as desired.

BRIEF DESCRIPTION OF THE DRAWINGS

These and other features, objects, uses, and advantages of the invention become apparent from reading of the detailed description with reference to the accompanying drawings wherein:

FIG. 5B shows a cross-section of an alternative embodiment of the invention allowing the preload on the bearings to be adjusted;

FIG. 9 is a partial cross-sectional view of an alternate embodiment of a suspension device in accordance with the invention;

FIG. 10 is a cross-section taken along line 10—10 of FIG. 9;

FIG. 11 is an exploded partial cross-sectional view of the suspension device as shown in FIG. 9;

FIG. 12 is an end view taken along line 12—12 of FIG. 11;

FIG. 13 is an end view taken along line 13—13 of FIG. 11;

FIG. 15 shows a partial cross-section of an alternate embodiment of the piston tube and bladder/accumulator system of the suspension device;

FIG. 16 shows an enlarged side elevation of a slider/retainer bearing assembly;

FIG. 17 shows a top view of the slider/retainer bearing assembly of FIG. 16;

DETAILED DESCRIPTION OF THE INVENTION

Figure 1:
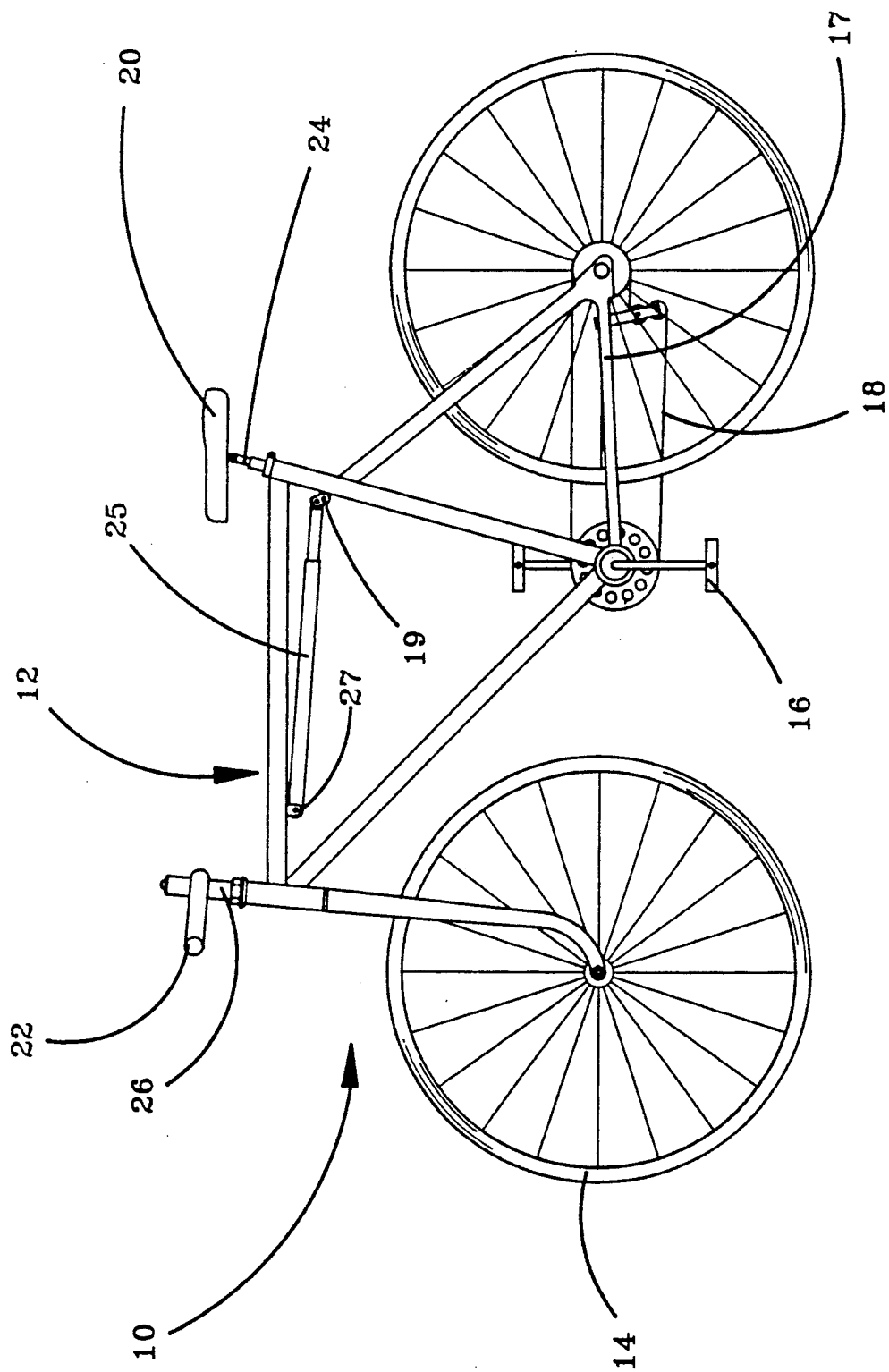
FIG. 1 is a side elevational of a bicycle incorporating the suspension system of the invention therewith.

Turning now to FIG. 1, a bicycle 10 of any conventional design includes a frame 12 having a pair of wheels 14 mounted thereon being driven by pedals 16 coupled with a chain drive 18 in the conventional manner. The bicycle 10 includes a seat 20 and handle bars 22 on which the rider will rest his or her body weight. The suspension system of the invention comprising an unique shock absorbent device at 24, 25 and 26 may be utilized to cushion and isolate shocks occurring at the locations of seat 20 and handle bars 22 for example.

Figure 2:
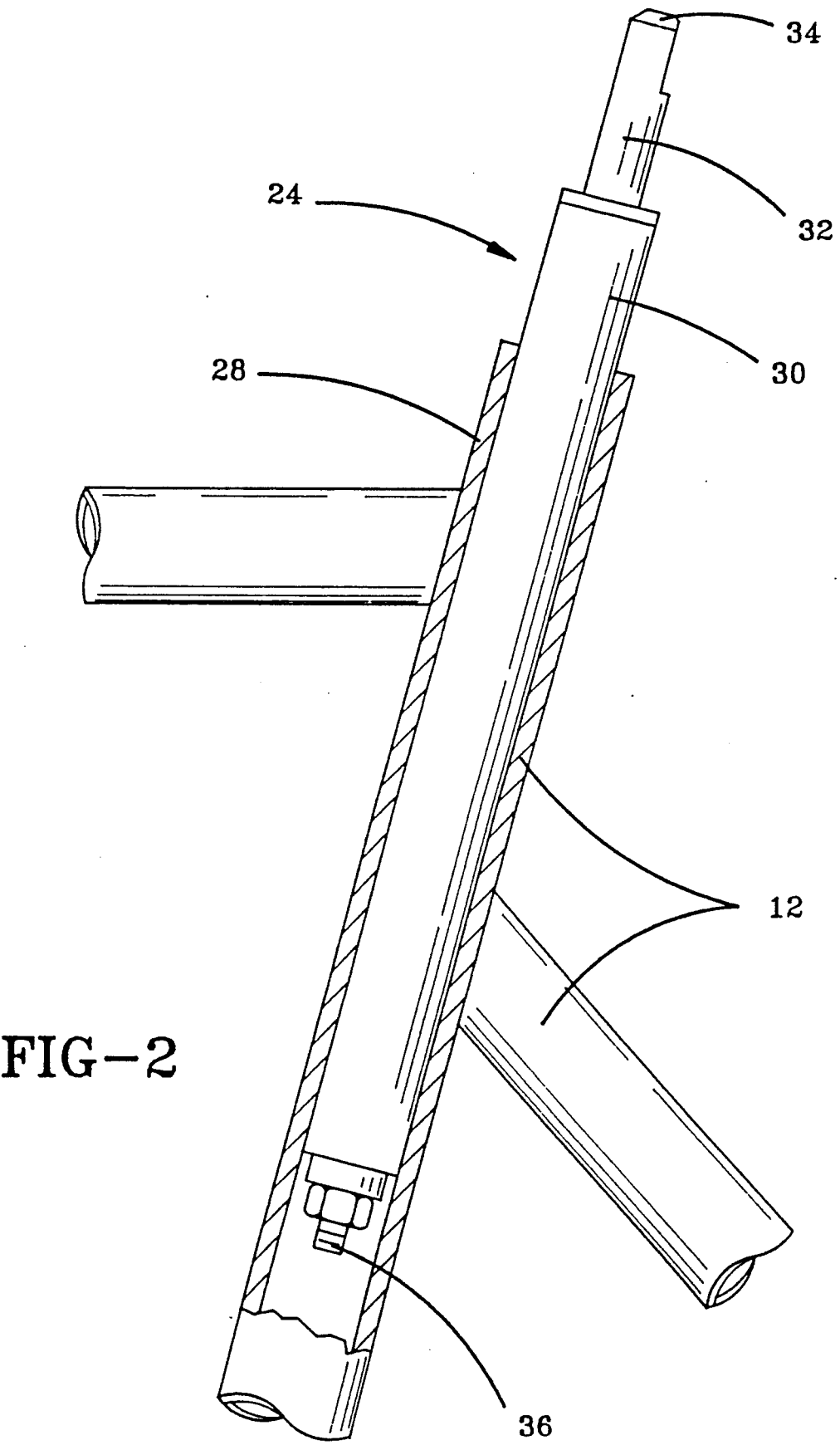
FIG. 2 is an enlarged partial cut-away view of one mounting location for the suspension device of a bicycle.

As seen in FIG. 2 a shock absorbing system 24 mounted at the seat location, extends into a tubular member 28 of the frame 12 and is secured thereto by means of a conventional clamping arrangement. The shock absorbing device 24 includes an outer tubing housing member 30 and a piston assembly or rod 32 disposed on the interior of the outer housing member 30 and extending outwardly therefrom to mount a seat or the like at its upper end 34. The outer tubular housing member 30 extends well into the tubular frame member 28 to provide sufficient rigidity and strength for support of the seat and the weight of the rider. The shock absorber 24 also includes a pre-load adjuster 36 for a variable rate spring assembly as will be more fully described hereinafter. In mounting for the handle bars of the bike may be similar, and the suspension system may also be utilized in conjunction with a sub-frame 17. The apparatus 25 may be supported on the frame 12 and coupled to frame 17 through toggle link 19 to allow relative movement of the back wheel.

Figure 3:
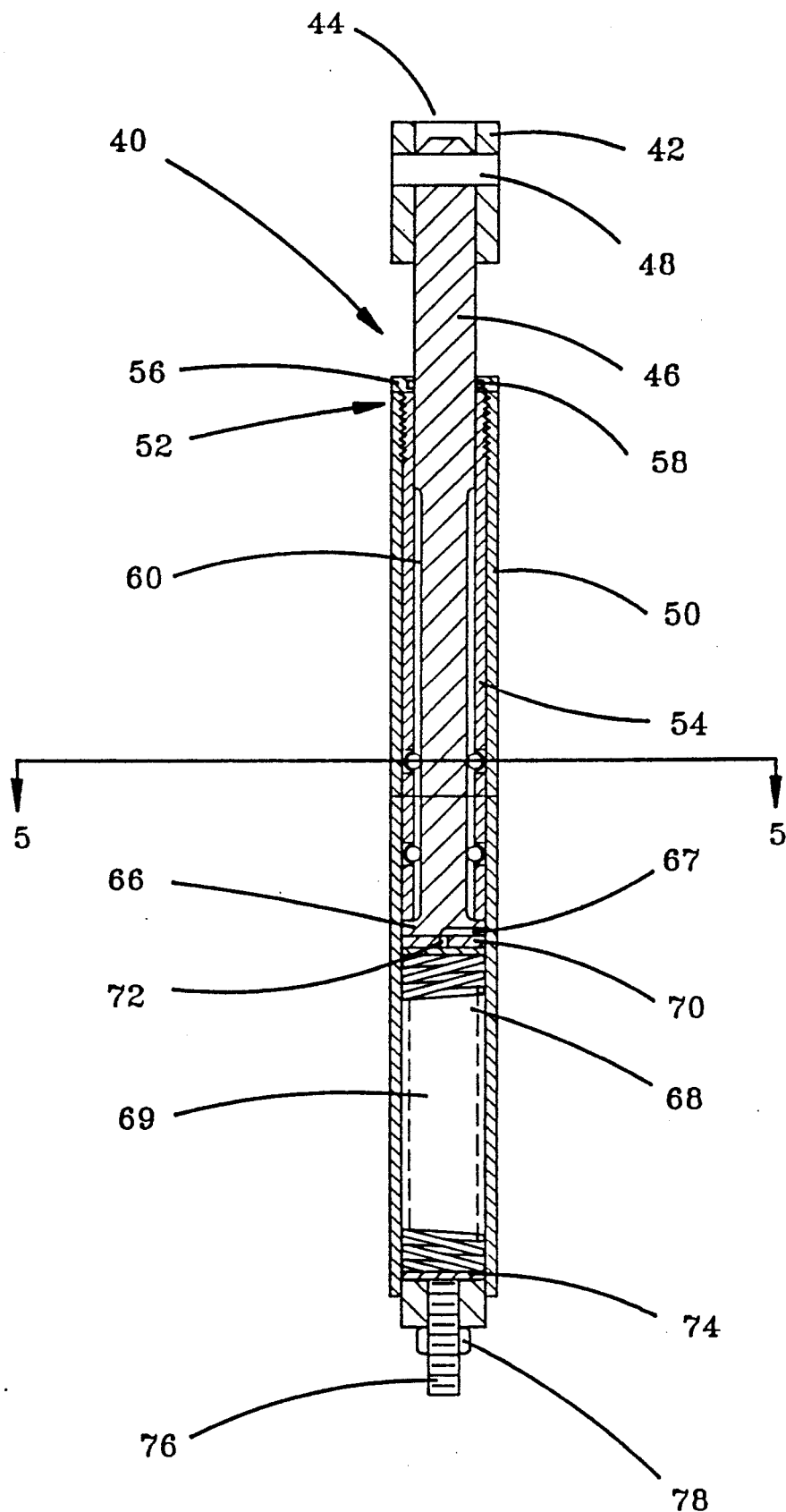
FIG. 3 is an enlarged partial cross-sectional view of a first preferred embodiment of the suspension system of the invention.
Figure 4:
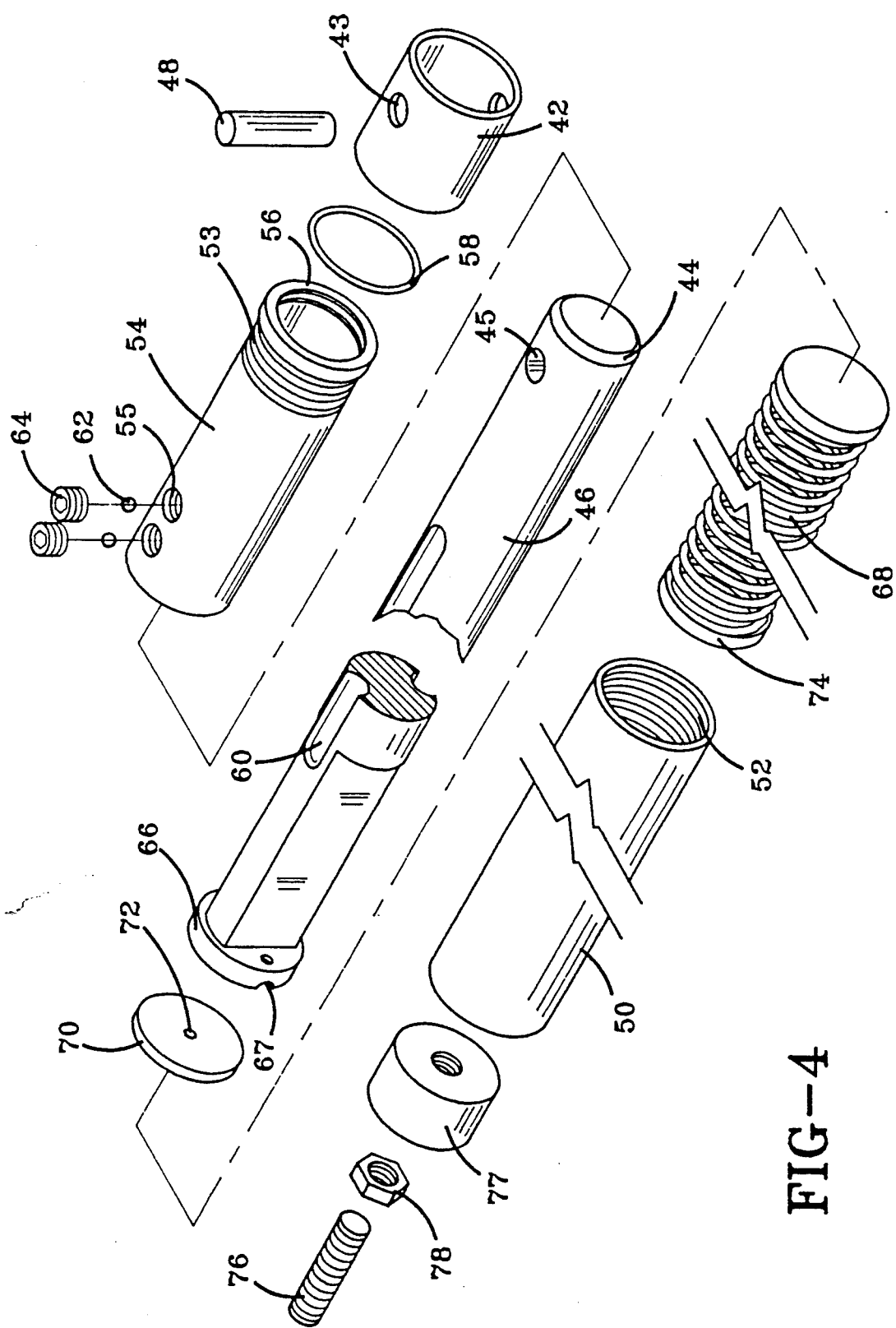
FIG. 4 is an exploded partial cross-sectional view of the suspension system as shown in FIG. 3.

Turning now to FIGS. 3 and 4 the shock isolator mounting apparatus for seat or saddles of a bicycle as well as other portions of the bike such as the front fork is shown in more detail. The shock isolating device generally designated at 40 comprises a seat adapter 42 positioned on the outer end 44 of a piston rod 46 by means of a lock pin 48. The piston assembly or rod 46 comprises a piston body 47 which extends outwardly from an outer tubular housing member 50 having an upper open end 52. A guide cylinder 54 may be disposed in the upper open end of the outer housing member 50 an includes a greater diameter portion 56 which supports the guide cylinder 54 within the outer housing member 50 and may be threadably secured thereto. The guide cylinder has a central aperture through which the piston body portion 47 extends into the interior of the outer housing member 50 and includes an O-ring seal 58 disposed around the piston body 47 to seal the structure at its upper end. The piston rod 46 includes first guide means or grooves 60 formed therein at which at least one bearing means 62 is disposed to permit telescopically slidable movement between the piston rod 46 and the tubular guide member 54. The tubular guide member 54 includes second guide means which may comprise at least one aperture formed therein through which a bearing seat or insert means 64 is positioned to coact with the bearing means 62 to maintain a position of the bearing means 62 with the tubular guide member 54.

The first guide means 60 formed in the piston rod 46 has a predetermined length to permit a selective amount of travel between the piston rod 46 and the tubular guide means 54, which will be sufficient to isolate any shocks incurred during use of the bicycle or other vehicle.

At the lower end of piston rod 46 is positioned a piston plate or piston head 66 having dimensions to be slidably received in the interior of the outer tubular housing member 50 with very close tolerance. The piston head 66 is acted on by a bias spring means 68 housed in the lower portion of the outer housing member 50. Interposed between the spring 68 and the piston plate 66 may be a dampening disk 70 covering the bottom portion of the piston plate 66 and having a selectively sized aperture 72 formed at the center thereof. The dampening disk is utilized for variable dampening control, wherein the aperture 72 formed therein may be of different selected sizes to permit variable dampening effects as will be hereinafter described.

Disposed within the spring chamber 69 of the outer housing member 50 is a hydraulic fluid such as oil which provides hydraulic actuation of the shock isolation device and dampening control during use. During compression of the piston rod 46 into the outer housing member 50, the hydraulic fluid in the spring chamber 69 will be made to flow through the aperture 72 formed in the dampening disk 70 and subsequently to the aperture 67 formed in the piston plate 66. In this way, hydraulic fluid may be introduced to the bearing means 62 as well as the surfaces of the first guide means 60 and second guide means or bearing seat 64 of the structure. By choosing the diameter of the aperture 72 formed in the dampening plate 70, a variable rate progressive dampening system to control piston rod compression stroke as well as rebound stroke of the piston rod is effectively controlled.

The dampening system and each compression or rebound stroke of a piston rod 46 will be directly controlled by the volume and viscosity of the hydraulic fluid disposed in the spring chamber 69 as well as the size of the aperture 72 and 67 in the dampening plate 70 and piston plate 66 respectively. As desired, the dampening force applied during a compression stroke of the piston 46 will act to permit flow of the hydraulic fluid and thereby dampen vibrations occurring due to new shocks absorbed by the system. Alternatively, on a rebound stroke of the piston rod 46, the hydraulic fluid flow from the upper chamber housing the guide means and bearing means of the structure will be restricted to permit smooth rebound to prepare for another shock isolation.

At the lower end of the spring chamber 69 of the structure, there is provided a lower spring piston 74 acted on by a preload adjuster 76 having a preload lock nut 78. By utilizing the pre-load adjuster 76, an adjustable spring preload to vary the biasing force applied by the spring 68 is effected. It should be noted that the travel of the piston rod 46 into the outer housing member 50 is not effected by adjustment of the preload adjuster 76 and is only limited by the length of guide means 60 provided in the piston rod 46. Thus, the biasing force applied by the spring 68 may be adjusted to accommodate persons of different weight to permit effective shock isolation without limiting the effective stroke of the piston rod 46 in this structure.

It should also be recognized that the structure permits smooth telescopic slidable movement between the piston rod 46 and guide member 54 and outer housing member 50. This is accomplished by supplying lubricating hydraulic fluid to the chamber above piston plate 66 of the piston rod 46 to lubricate the bearing means and guide surfaces thereof. In this way, the bearing means permits smooth slidable movement with very low friction and wear of the component parts.

As seen in FIG. 4, an exploded view of the shock isolation device 40 reveals in more detail, the structure of the individual components in the device. The outer tubular housing member 50 has at its upper end a threaded aperture 52 which coacts with threads 53 positioned on guide member 54 to firmly secure the guide member 54 thereto. The guide member 54 is seated against the top edge of the outer housing 50 and includes an o-ring seat to accommodate an o-ring 58 for sealing with the piston rod 46. A piston rod 46 includes first guide means 60 formed as grooves in the piston body 47 which coact with a bearing means 62 which are themselves seated in bearing seats 64 inserted through apertures 55 in the guide member 54. The piston rod 46 also comprises a piston plate or head 66 having channel aperture 67 to permit hydraulic fluid flow from below the piston plate 66 to the guide means 60, bearing 62 and bearing seat 64. The aperture 67 also permits lubrication of the piston rod along its length to the o-ring seal to reduce friction and extend the useful life of the system. The dampening disk 70 is provided to seat against the lower edge of piston plate 66 having an aperture 72 therein which may be of variable size to permit the variable dampening characteristics of the device. The aperture 72 coacts with the channel 67 to permit flow around the piston plate 66 as is desired.

When the piston rod 46 is positioned within the outer housing member 50, a spring chamber to house spring member 68 is formed below piston plate 66 in which hydraulic fluid is placed. At the bottom of the outer housing member 50 is an aperture to receive preload adjusting rod 76 which threadably engages aperture 77 and extends into the interior of the outer housing member 50 to act on a spring disk 74 positioned at the lower edge of the spring 68. A sealing and locking nut 78 will prevent relative movement of the preload adjustor 76 once it is positioned to give the desired preload to the spring 68.

Figure 5:
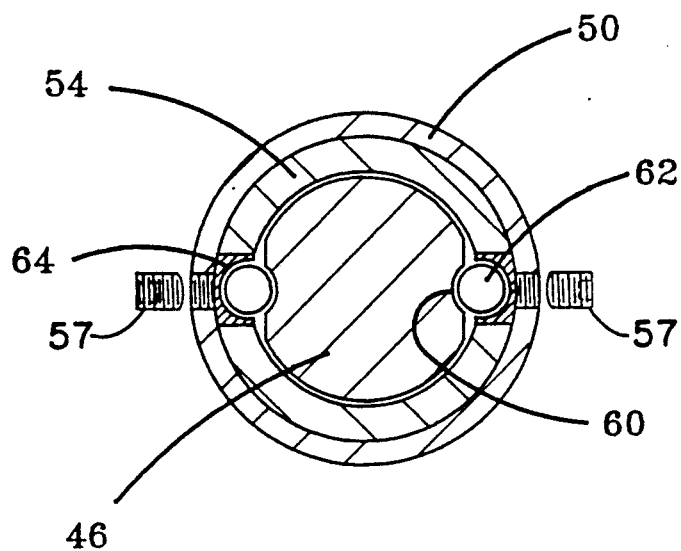
FIG. 5 shows a cross-section taken along line 5—5 of FIG. 3.

As shown in FIG. 5, the bearing means 62 may have a diameter to permit telescopic slidable motion but prevent any relative rotation between the piston rod 46 and the guide cylinder 54. As seen in this Fig., tolerances between the piston rod 46 having the guide channel 60 formed therein and association with the seat 64 act to closely confine the bearing means 62 with the guide means to prevent any relative rotation between the components. By providing adjustable inserts 57 associated with the bearing seats 64 or with guide inserts comprising guide grooves associated with the guide sleeve/outer housing, the adjustable inserts 57 may be provided to adjust the location thereof relative to the bearings. In this way, preload to the bearings may be adjusted, influencing the degree that relative rotation of the piston and outer housing is prevented or restricted.

Figure 5A:
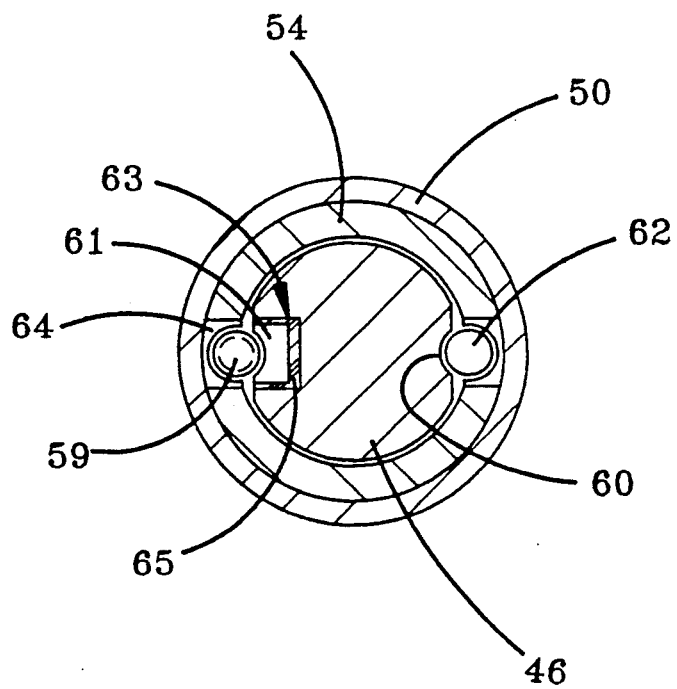
FIG. 5A shows, a cross-section taken along line 5—5 of FIG. 3 and an alternate embodiment thereof.

Turning now to FIG. 5A, an alternate embodiment of the invention is shown wherein a degree of rotational movement is enabled, thereby affording a range of movement in a second directional plane relative to the movement of the piston rod in a first directional plane. In this embodiment, the limited range of movement may be accomplished by providing a bearing race insert 61 for the piston rod 46 in which the bearings 62 are positioned. A tolerance is provided under the insert 61 at 63 in which a resilient material 65 is disposed. The resilient material 65 allows limited movement of the race insert 61 and thereby the degree of rotational movement as desired. It also acts to bring the seat back to its initial aligned position automatically. Alternatively, this movement can be achieved by merely changing the diameter of the bearing means as shown at 59 positioned in the guide means 60 and bearing seats 64. It has been found that the use of the shock isolation mounting system for the seat of a bicycle may provide additional advantages to the rider to increase comfort and flexibility of the bicycle.

Turning now to FIG. 5B, an alternate embodiment of the invention is shown, wherein the preload on the bearing structure may be adjusted to accommodate machining tolerances, wear or desired riding characteristics easily and effectively. As seen in FIG. 5B, and similar to the arrangement shown in FIG. 5 for adjustment of the bearing seats 64 or the like, the piston body 46 may be formed as having a longitudinally extending aperture 71 adapted to threadably engage an adjustment means or post 73. The piston body 46 may be provided with longitudinally extending holes 75 adapted to accept a resilient member 79 and guide means insert 81 having a longitudinally extending groove formed therein which will act as the first guide means to house a plurality of roller bearing 83 or the like. With this structure, the piston body 46 will be positioned within a guide sleeve or the outer housing member as previously described, with the bearing race inserts 81 positioned in holes 75 to house roller bearings 83 in conjunction with the guide means formed on the outer housing member or guide sleeve. Adjustment of the preload on the bearings 83 may then be performed by simply screwing adjustment rod 73 further into or out of aperture 71 formed in piston body 46. As is seen in FIG. 5B, the adjusting rod 73 is provided with tapered surfaces 85 which correspond to the inner surfaces of bearing inserts or races 81. By screwing adjustment rod 73 into or out of aperture 71, the force imparted to the bearing races 81 via the resilient member 79 will be adjusted, thereby varying the preload exerted on the ball bearings 83 or similar bearing means in the suspension device. It should of course be recognized that various methods of varying the preload to the bearing race 81 may be achieved and are contemplated by the invention.

During riding of the bicycle, the riders natural body movements include lateral or side-to-side movement which is translated to the mid-portion of the rider as he or she pedals. In some situations, rotational movement of the seat is not desired and the system can be designed as shown in FIG. 5 to prevent relative rotation of the piston rod 46 relative to the guide means 54 to limit movement of the system to one directional plane only. Alternatively, in other situations, the lateral movement of the rider during the pedaling action tends to create undesired forces against the rider from the seat which are desired to be avoided. By providing a limited amount of relative rotation between the piston rod 46 and the guide cylinder 54 in the structure, the seat which is mounted on the piston rod 46 is capable of a limited amount of rotational movement. By providing a range of movement in this second directional plane, the riders natural movements are compensated for in the seat to result in a more comfortable ride.

For example, the limited amount of rotational movement desired at the location of the seat to accommodate the riders natural movements during pedalling may be in a range of three degrees to ten degrees total motion, but may be adjusted for the particular rider and their body movements for the most comfortable ride. As seen in FIG. 5A, the size of the bearing 62 may simply change or the bearing seat 64 can change in association therewith to provide movement only in the guide means 60 formed in the piston rod 46. Alternative methods of providing the limited additional movement in a second directional plane will be apparent to those skilled in the art and are contemplated by the present invention.

Figure 6:
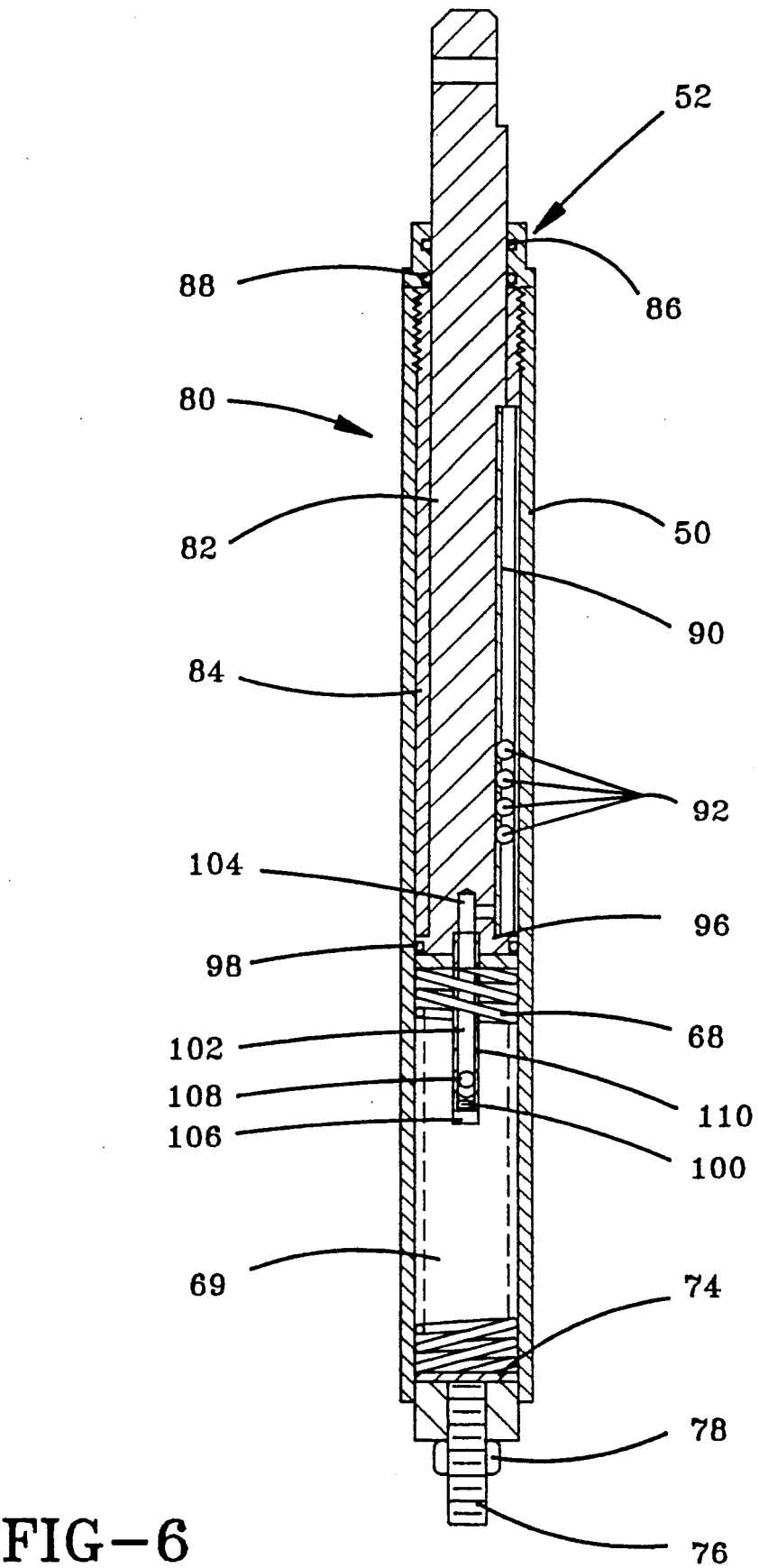
FIG. 6 is a partial cross-sectional view of an alternate embodiment of the suspension system.

Turning now to FIG. 6 an alternate embodiment 80 of the shock isolation system as shown. Many of the component parts of the system 80 are identical to those described with reference to FIGS. 3 and 4 and are indicated by like reference numerals. The shock isolating mounting apparatus 80 comprises a seat adapter 42 positioned on the outer end 44 of a piston assembly or rod 82 by means of a lock pin 48. The piston rod 82 includes a portion which extends outwardly from the interior of an outer housing member 50 at upper open end 52 thereof through a guide cylinder 84 which is also disposed in the upper open end 52 of the housing member 50. The guide cylinder 84 may be threadably secured to the housing member 50 as previously described and includes several o-ring seats and seals as shown at 86 and 88. The guide cylinder 84 is thus sealed with the piston rod 82 and the outer housing member 50 at the upper end of the assembly. The piston rod 82, in this embodiment of the invention, includes first guide means insert 90 which may be a bearing race of hardened metal to house a plurality of bearing means 92 therein. The guide cylinder 84 also includes second guide means which may be a bearing seat or race 94 of hardened metal to permit the telescopic slidable movement between the piston rod 82 and the tubular guide member 84. As with the previous embodiment of the invention, the coacting relationship between the first guide means 90 and second guide means 94 of the piston rod 82 and guide cylinder 84 respectively allow the selective amount of travel therebetween to isolate any shocks incurred. It is noted in this embodiment of the invention that similar functions may be achieved by providing guide means and bearing means on only one side of the piston rod 82 and conjunction with the guide cylinder 84, or alternatively may again be provided on diametrically opposite sides of the apparatus. The bearing races 90 and 94 allows both rotational and longitudinal movement of the bearings 92 and therefore provide very smooth and efficient operation.

At the lower end of the piston rod 82 is positioned a piston plate or head 96 having an o-ring seat and seal 98 on the exterior circumferential surface thereof to permit a tight seal with the outer housing member 50 while still enabling slidable movement therebetween. A piston plate 96 is again acted on by a spring 68 housed in the lower portion 69 of the outer housing member 50 in which hydraulic fluid may be disposed.

This embodiment of the invention also includes a different dampening system wherein a dampening valve 100 is provided to be threadably secured to the lower end of the piston rod 82 at a center portion thereof. The dampening valve 100 includes a housing having a central aperture 102 therein which will permit oil flow into an aperture 104 formed in the piston rod 82 which extends to the guide means situated above piston plate 96. The valve 100 also includes a jet nozzle insert 106 which is threadably secured into the lower end of the valve 100 and has an aperture of variable size formed therein. A check ball 108 is disposed in the aperture 102 an has dimensions to seat against the upper end of the jet 106 to effectively seal the aperture formed therein when desired.

In this way, the dampening valve 100 acts as a check valve wherein upon a compression stroke of the piston rod 82 the ball 108 will become unseated and hydraulic fluid will easily flow through the valve 100 and upwardly into the guide means to lubricate the bearing surfaces and permit a dampening action based upon the size of the aperture formed in the jet 106. During the rebound stroke, the ball 108 will seat and seal the aperture of the jet 106 such that hydraulic fluid will be made to flow through an aperture 110 formed in the housing of valve 100. As the flow through the aperture 110 is somewhat restricted, the valve 100 will permit a smooth rebounding action as desired. This system is particularly advantageous as the valve 100 extends well into the hydraulic fluid disposed in the lower spring chamber 69 to provide better dampening characteristics to the system. The other aspects of the system are identical to that previously described including the adjustable spring preload to compensate for riders having different weights and yet not limiting the effective stroke of the apparatus.

Figure 7:
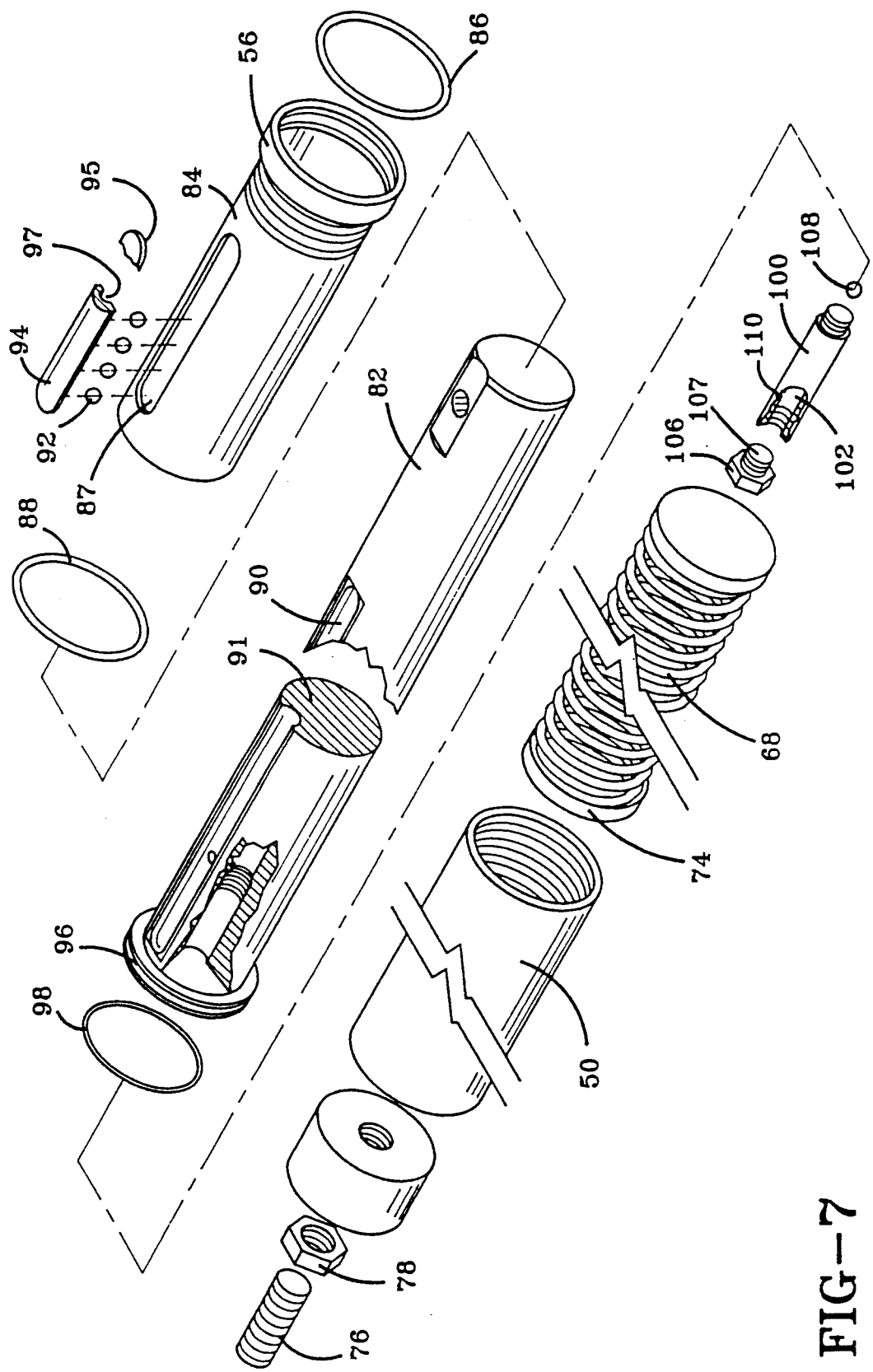
FIG. 7 is an exploded partial cross-sectional view of the alternate embodiment of the suspension system as shown in FIG. 6.

As seen in FIG. 7, the components of the shock isolation mounting device are shown in more detail. The outer tubular housing member 50 is similar to that previously described and will house spring 68 in a lower portion thereof along with a lower spring piston 74 to be acted by preloader 76 at the lower end thereof. The guide cylinder 84 having upper end 56 with o-ring seats and seals 86 and 88 is threadably connected to the upper end 52 of the outer housing member 50. The guide cylinder 84 includes an elongated aperture 87 having the ends thereof machined out to form a plurality of seats 89 in which second guide means insert having surfaces 95 coacting with surfaces 89 will seat to provide a flush outer surface to the guide cylinder 84. The bearing race inserts 94 have a curved inner surface as shown at 97 to form in conjunction with the first guide means 90 of the piston rod 82, a bearing race surface over which the bearings 92 will smoothly roll or slide. The guide means 90 of the piston rod 82 may be formed as inserts similar to bearing race inserts 94 of the guide cylinder 84 as shown at 91.

The dampening valve means 100 of this embodiment includes a housing having an aperture 102 which is threadably coupled to the base of the piston rod 82 in connected to an aperture formed in the piston rod for supplying hydraulic fluid to the guide means and bearings associated therewith. A jet-type nozzle 106 may be threadably coupled to the lower open end of the valve 100 which has an aperture 107 which may vary to restrict the flow of hydraulic fluid therethrough and adjust the dampening characteristics of the assembly. A check ball 108 will seat against the aperture 107 in the jet nozzle 106 to selectively cut off the flow through the aperture 107 such as during a rebound stroke of the piston rod 82. It should be seen that the flow of hydraulic fluid will seat or unseat the check ball 108 according to the direction of the flow, wherein when the check ball 108 is seated against the aperture 107, hydraulic fluid will be forced to flow through aperture 110 formed in the housing of valve 100 to provide proper functioning of the dampening arrangement. Limited rotational movement may be provided as previously described.

Figure 8:
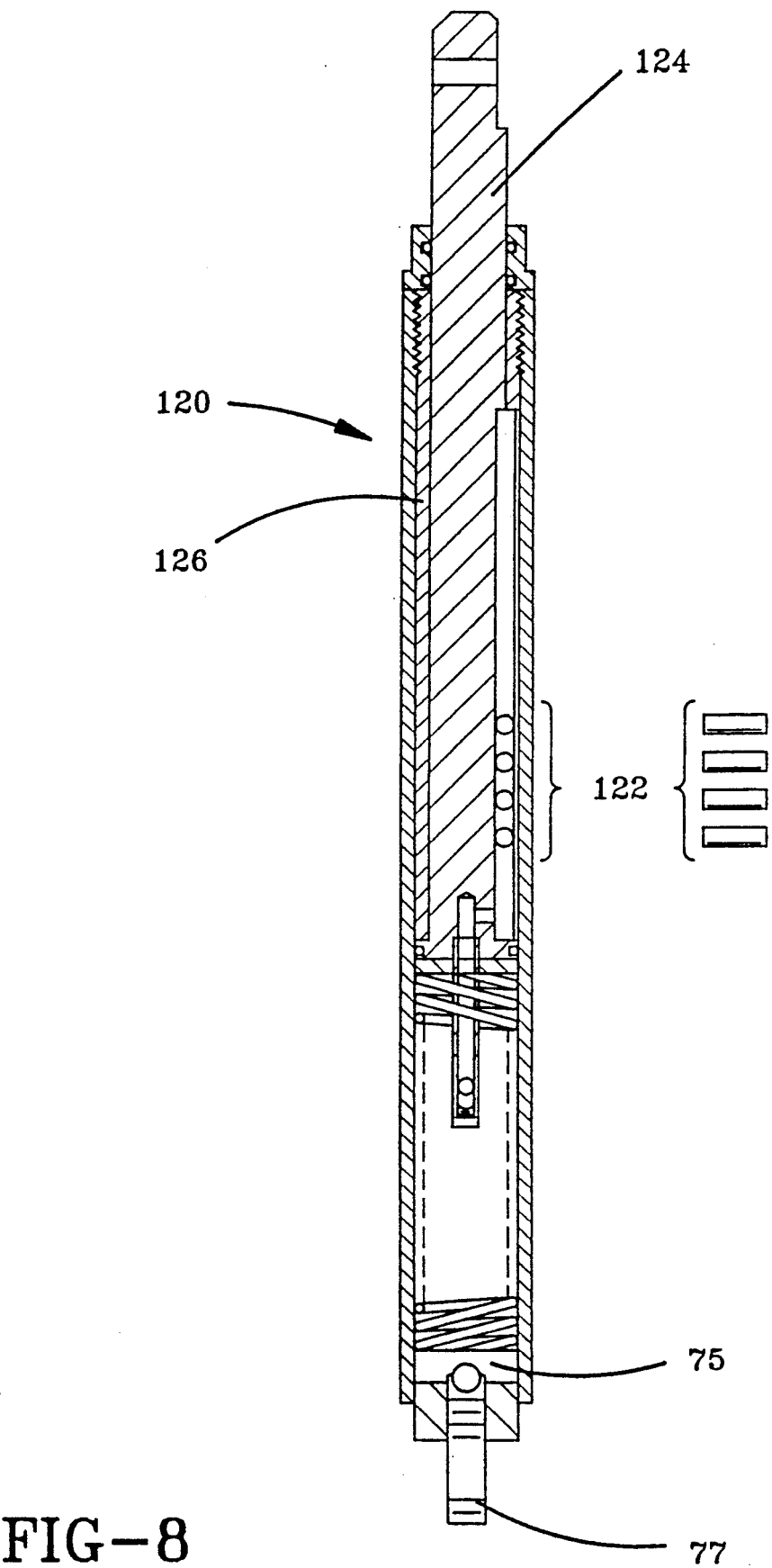
FIG. 8 is s a partial cross-sectional view of an alternate embodiment of the suspension system.
Figure 14:
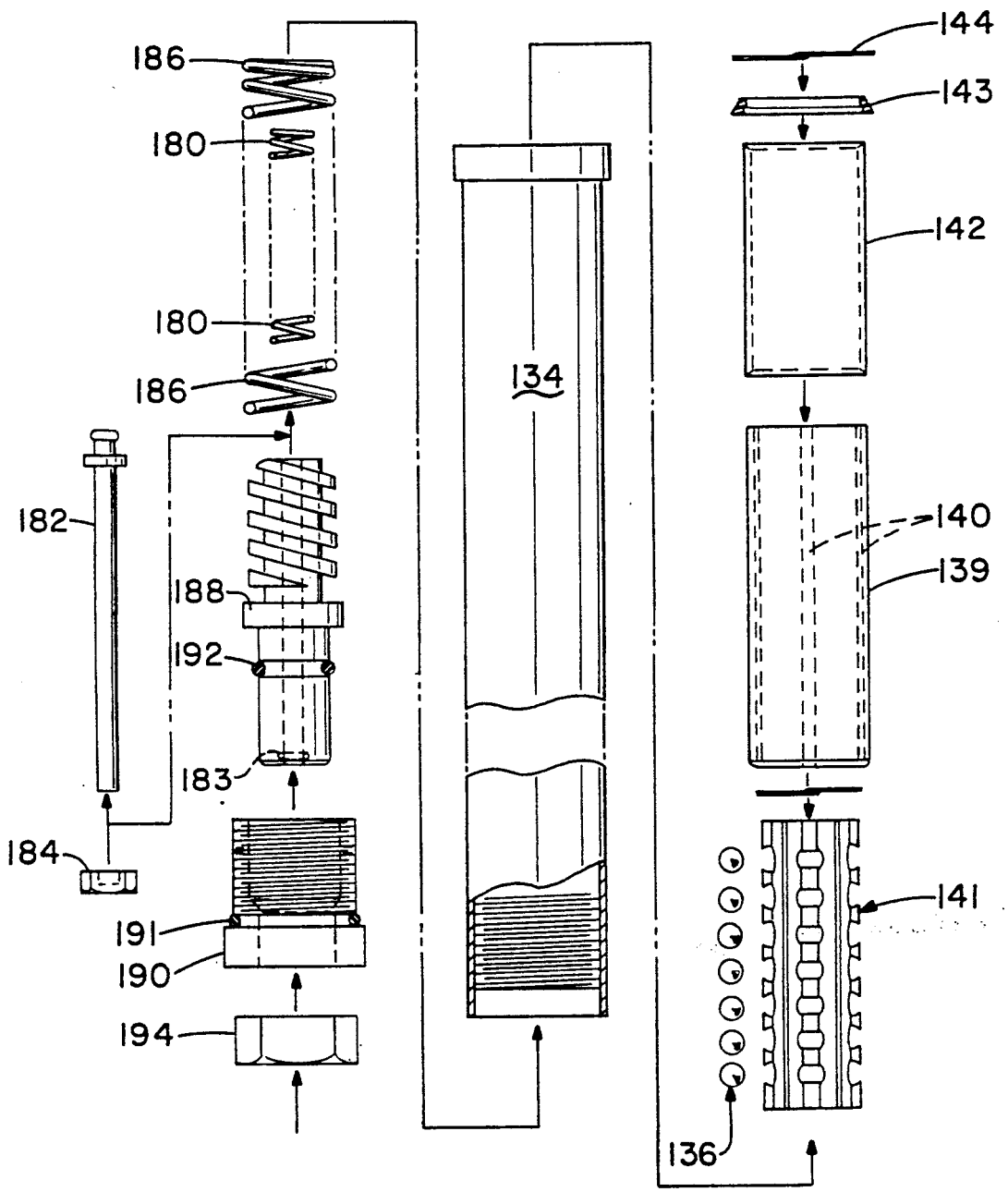
FIG. 14 is a continuation of an exploded partial cross-sectional view of the suspension device as shown in FIG. 9.

Turning now to FIG. 8, another embodiment of the invention utilizes needle bearings as opposed to roller bearings to reduce machining and cost of the apparatus. The shock isolation mounting system 120 in this embodiment utilizes many of the same components which operate in a manner previously described and will not be reiterated for convenience. The system varies in that a bearing means associated with this embodiment comprises needle bearings 122 which are merely slid into guide grooves or channels formed in the piston rod 124 and guide cylinder 126 or alternatively simply in the piston rod 124 alone. The guide grooves in this or the other embodiments of the invention, do not have to be formed by inserts and may be machined in the rod 124 and guide cylinder 126 themselves. The dampening and lubricating aspects of the invention may remain similar to that of the embodiments previously described, and as with the embodiment of FIGS. 3 and 4, the system may afford a non-rotation type embodiment or a limited amount of rotational movement between the piston rod 124 and guide cylinder 126 to gain the advantages mentioned.

It is also shown in this embodiment that an inert gas charge 75 may be provided to act as a bias means or for spring adjustment. An accumulator or bladder could also be provided in space 25 to accept and retain the gas charge if desired. A valve 77 may be positioned a the bottom end of the outer housing member to provide the gas charge to the system.

Turning to FIGS. 9-14, an alternate embodiment of the invention is shown, which is applicable in all locations for providing suspension to different portions of the bicycle. In this embodiment, the suspension device generally designated 130 also includes a piston body 132 adapted to extend outwardly from an outer tubular housing member 134 similar to that previously described. In this embodiment, the piston body or tube 132 is a hollow tubular member and is adapted to accept bearing means such as roller bearings 136 within first guide means 138, being one or more longitudinally extending grooves formed in the piston tube 132. The first guide means 138 are adapted to coact with second guide means 140 formed in the external tube housing 134 or within a guide sleeve 139, wherein the bearing means 136 will be retained within the first and second guide means 138 and 140 while allowing relative longitudinal movement of the piston tube 132 relative to housing 134. The piston body 132 is a tubular member, and is inserted into housing 134 through a sleeve bearing 142 and is sealed with the outer housing 134 by means of an O-ring or other seal 143 and a seal retaining means 144. The sleeve bearing 142 helps maintain alignment of the piston body 132 and acts as a load bearing structure while allowing smooth, low friction telescoping movement with respect to housing 134. Within the upper portion of piston tube 132 is an accumulator pressure chamber 146, and within the accumulator chamber 146 is positioned an accumulator piston 148. The accumulator piston 148 includes seals 149 which contact the inner surfaces of chamber 146, and as will be further described facilitates separation of a gas charge from hydraulic fluid within the suspension device 130. The accumulator piston is sealed at the bottom of pressure chamber 146 by a sealing member 137. The piston tube 132 also internally accepts an inner valve cap 150 which is connected to a center linkage tube 152 at one end thereof, while the opposite end of linkage tube 152 is coupled to a rotating disk valve 154 positioned within housing 134. The rotating disc valve 154 is provided with tapered dampening ports 156 and secured to a piston head 158 which is slidably disposed within housing 134 and sealed with the interior surfaces thereof by means of sealing members 159 and 160.

Also provided in interacting relationship with rotating disk valve 154 is a disk valve means 162 which is held stationary or in a non-rotating position by means of a pin 161 adapted to coact with one of the guide means 138 formed on piston tube 132. The piston head 158 is positioned between disk valve 162 and a piston fastener 170, while being loosely fitted in movable relation with linkage tube 152 to allow for oil flow or any misalignment between outer housing member 134 and linkage tube 152 and to permit oil flow to valve disk 154 and 156 therewith as previously described. The piston head 158 acts to divide the interior of housing member 134 into a compression hydraulic chamber 172 and a rebound hydraulic chamber 174. The sealing member 159 may be a face seal to allow sealing of the piston head 158 on a compression stroke of the piston during operation. Also associated with piston head 158 is a disk valve 163 positioned below piston head 158 adjacent piston fastener 170. The disk valve 163 includes orifices 165 which may be aligned with orifice 171 formed in piston fastener 170. An orifice 157 is provided within linkage tube 152 at a position between stationary disk valve 162 and disk valve 163. Also positioned between piston head 158 and disk valve 163 as an optional feature, are piston head bias spring means 167 which may be utilized to provide an outward biasing pressure between valve means 154 and piston head 158. An orifice 164 is also provided within stationary disk valve 162, which communicates with valve ports 156 of disk valve means 154.

Extending through piston head 158 is the center linkage tube 152, which has formed therein an accumulator orifice 176. The accumulator orifice 176 has associated therewith a tapered accumulator valve 178 which is rigidly attached to an inner spring member 180 situated within compression chamber 172. The inner spring member 180 is also rigidly attached to an external linkage rod 182, which is sealed at 183. A control knob 184 coupled to external linkage rod 182 allows rotation of the external linkage rod 182 and therefore of inner spring 180. An outer spring 186, also positioned within compression chamber 172 about inner spring 180, is rigidly attached to center linkage tube 152 at one end thereof, and the spring windings are left open at the opposite end to accept spring preload adjuster 188 by threaded engagement therewith. The spring preload adjuster 188 and outer spring 186 are housed within an end cap 190, and this assembly is sealed by means of an 0-ring 191 or the like. The spring preload adjuster 188 is sealed by means of an 0-ring 192, and adjuster 188 is coupled with a control knob 194 which is mounted on the outside of housing 134. Although mechanical springs have been described in the embodiments of the invention, it should be evident that compression chamber 172 may be produced with an inert gas charge which will act as a gas spring having similar characteristics. A valve could then be used to vary the preload provided by the gas spring.

In operation, the compression chamber 172 will be filled in part by hydraulic fluid, and variable rate dampening is provided by means of movement of piston head 158 and the associated valving means comprising disk valves 154, 162 and 163. The variable rate dampening characteristics may be varied and or partially or completely locked out to eliminate suspension action by rotating the first control member 184 to modify the size of accumulator orifice 176 provided in linkage tube 152 which is coupled to the pressurized accumulator pressure chamber 146. By rotation of control member 184, rotation of inner spring member 180 along with tapered valve 178 will occur, thereby opening or closing accumulator orifice 176 so as to vary hydraulic fluid flow to and from the accumulator piston 148 and pressure chamber 146. Individual control of compression chamber 172 and rebound chamber 174 dampening is controlled externally by the second control member 194. It is also noted that second control member 194, being fixedly coupled to outer spring member 186 will control preload adjustment of the spring member 186. For example, by turning second member 194 counterclockwise, the spring member 186 will thread out of the adjuster link 188, thereby increasing preload on spring member 186 by decreasing the distance from the opposite end of the spring 186 to the piston fastener 170 at its other end. Similarly, rotation of control member 194 clockwise will decrease preload accordingly.

The bladder/accumulator configuration including accumulator pressure chamber 146, accumulator piston 148, the linkage tube 152 and accumulator valve 178 act to compensate for different volumes in the variable rate dampening structure wherein a volume of hydraulic fluid will pass to and from compression chamber 172 and rebound chamber 174 during compression or rebound strokes of the piston and piston head 158. In this embodiment, compensation for the different volumes is achieved by a pressure system, but it should be understood that a bladder system may also be utilized to achieve similar characteristics as will be hereinafter described. The pressure or bladder system facilitates maintenance of the dampening system by eliminating air in the system, such that dampening will occur smoothly and consistently for each compression and rebound stroke. The difference in volumes between compression chamber 172 and rebound chamber 174 is the area consumed by the piston body 132 in rebound chamber 174, which will optimally accept between 50 and 80 percent of hydraulic fluid from the compression chamber 172 during a compression stroke relative to dimensions of the piston body 132 and outer housing 134 volume. The pressure bladder/accumulator system of this embodiment utilizes the accumulator piston 148 with seals 149 to separate the air charge or gas in pressure chamber 146 from hydraulic fluid. Because the piston body 132 is a hollow tubular member in this embodiment, the accumulator pressure chamber 146 and accumulator piston 148 may be housed within a valve cap 150 or directly in piston tube 132, and being sealed at the end of piston body 132 by means of seal 133. A pressure valve 135 may be utilized to adjust pressure within pressure chamber 146, to allow adjustment of pressure externally by the rider of the bicycle. Alternatively, a bias spring could be used in place of a gas charge within pressure chamber 146 or the pressure chamber 146 could be an external cylinder if desired. With an external cylinder, hydraulic fluid would pass through accumulator valve 178 by means of accumulator orifice 176 so as to fill pressure chamber 146, with the gas charge being housed in an external cylinder coupled therewith. Adjustment of the pressure at the location of the external cylinder would thereby be easily accomplished.

As still another embodiment, the use of a balloon or bladder type system could be utilized with an external valve, wherein such a configuration would eliminate the necessity for valve cap 150, the accumulator piston 148 and associated seals 149 as well as the pressure chamber seal 137. As seen in FIG. 15 for example, the bladder/accumulator system may utilize a close cell sponge 200, such as a neoprene sponge having air encapsulated therein, wherein the sponge will be resistent to the hydraulic fluid within the accumulator chamber 146 of piston body 132. This type of bladder may be utilized at very low cost, and yields operational advantages such as the ability to position the suspension device in various locations of the bicycle while avoiding seals or pistons to retain a gas charge as previously described. As the close cell sponge retains air within internal pockets thereof, the sealing and accumulator piston structure as described may be eliminated. The use of a close cell sponge bladder also allows locating the bladder within accumulator chamber 146 as seen in FIG. 15, or alternatively the bladder 200 may be located in the compression chamber 172 as previously described. By placing the closed cell sponge bladder within the compression chamber 172, the need for the inner spring member 180 would be eliminated as the closed cell sponge bladder would effectively take its place. It should be recognized that the function of the bladder to compensate for different volumes to maintain the proper dampening characteristics and eliminate air in the system may be achieved by either placement. The use of a close cell sponge as the bladder in the suspension device has proven to be very economical and functional while providing the desired operational characteristics.

In the variable rate dampening system of this embodiment, the adjustment knob 194 is rotated to vary the amount of dampening achieved in the system. The control member 194 is coupled to the threaded preload adjuster 188 and therefore to outer spring member 186 at one end thereof and to the disk valve assembly comprising piston fastener 170, linkage tube 152, second valve means 154 and adjustable ports 156. Rotation of control knob 194 will modify the flow of hydraulic fluid from the compression chamber 172 to the rebound chamber 174, and can cause partial or complete lockout of the suspension system by or to virtually eliminating the flow of oil between chambers 172 and 174. The control knob of 194 may be rotated clockwise to seat the threaded preload adjuster 188 and outer spring 186 bottom at thread ends so as to turn the spring member 186 which internally will rotate the disk valve assembly as previously described. Rotation of the disk valve assembly causes the alignment or gradual non-alignment of tapered ports 156, thereby restricting hydraulic fluid flow depending upon the size of the tapered ports 156 opened between rotating disc valve 154 and the stationary disk valve 162.

Initial hydraulic fluid flow is opened upon a compression stroke when movable piston head 158 is forced by hydraulic pressure toward disk valve assembly 154. Correspondingly, rebound chamber 174 is opened to accept the flow of hydraulic fluid between piston fastener 170 and the orifice 171 formed therein so as to flow from the compression chamber 172 to rebound chamber 174. The loose fit of piston head 158 allows for hydraulic fluid to migrate to disk valve 154, and such migration is sealed by face seal 159 to the stationary disk valve means 162. In this manner, hydraulic fluid is only able to flow through the various ports of the disk valve assembly to achieve the dampening characteristics. For example, by closing ports 164 and ports 156, hydraulic fluid is stopped and movement of piston head 158 and piston body 132 is stopped, thereby partially eliminating suspension movement.

As an alternative to varying dampening in this manner, the closing of the ports may also be controlled at the location of piston body portion 132 via valve handle 135. Upon rotation of the valve cap 150 by means of valve handle 135, the linkage tube 152 will be rotated along with the disk valve means 154 so as to alter the port size between stationary valve means 162 and movable valve means 154. It is also noted that partial lockout or stopping of suspension movement may be achieved by closing accumulator valve 178, or also by only closing ports 156 and ports 164 of the disk valve assembly. Total lockout may be achieved by simultaneously closing both the accumulator valve system and disk valve system port. It should also be understood that although reference has been made to a compression stroke of the suspension device, dampening characteristics in the rebound stroke may also be controlled in a similar manner by one or more of the techniques previously described. For example, in an embodiment of the suspension device, a piston fastener 170 having orifice 171 formed internally therein may be used to provide rebound stroke dampening. When piston body 132 is on rebound stroke, the slidable main piston 158 will be pressurized by hydraulic fluid flow back toward compression chamber 172, wherein such flow may be restricted through orifice 171. The piston head 158 seals at the face of piston fastener 170 at the first disk valve means 163 so as to slow the rebound stroke. Alternatively, another orifice could be used to vary oil flow from rebound chamber 174 to compression chamber 172, wherein the orifice 157 may be formed through the collar of second disk valve means 154 and the linkage tube 152, so as to return through the accumulator orifice 176. As previously described, the accumulator orifice 176 is variable by means of the accumulator valve 178, inner bias spring 172, second linkage means 182, and the control member 184. As an alternative, the first disk valve means 163 may be provided with an orifice or separation between piston head 158 and piston fastener 170 to allow a restricted flow of hydraulic fluid therebetween, or in conjunction with port 171 on piston fastener 170.

In this embodiment of the invention, the piston head 158 being loosely fitted in slidable relation within housing 134 may be utilized to facilitate the dampening characteristics at the location of piston head 158. The ports 164 associated with the stationary valve means 162 along with the ports 156 associated with movable valve means 154 may be provided as face type ports formed in these disk valves. As the typical mounting angles of the suspension device at various locations on a bicycle are normally between 70 and 80 degrees, heavy side loads are generated on moving components of the system. By providing face type ports, which seal on the faces of disk valves 154, 162 and also on piston head 158 and piston fastener 170, a slight misalignment of piston head 158 may occur without loss of sealing action under heavy side loading. Also, clearances caused by minor wear of components and initial machine and tolerances are accounted for.

As previously mentioned, the configuration of piston head 158 may also utilize a bias spring means 167 between disk valve means 154 and piston head 158. The bias springs 167 may be wave springs or coil springs or any other suitable biasing means to achieve the desired bias pressure. The springs 167 provide pressure which pushes piston head 158 toward compression chamber 172 or the disk valve means 163 and piston fastener 170. This force produces a resistance on a compression stroke rendering some compression stroke dampening which is directly related to the preload, size or number of biasing members 167. In effect, this will give some dampening if adjustable ports 156 and 164 are fully opened. The spring members 167 also facilitate the mechanical return of piston head 158 to a closed position with oil return through orifices 157 or through the disc valve means 163. It should also be noted that during a rebound stroke, bias pressure may also be provided between piston head 158 and disk valve 163 so as to restrict hydraulic fluid flow through orifices 165 which may be formed in disk valve 163. In this way, rebound dampening and rebound pressure would be relative to the pressure of the bias spring means between disk valve 163 and piston head 158.

It should be evident that the variations discussed relative to the dampening system of the invention may be used exclusively or in conjunction with one another to produce the variable rate dampening or different dampening characteristics desired. The embodiments discussed with respect to the dampening and bladder-/accumulator systems show three distinct chambers for hydraulic and pressure variations with infinite combinations for adjustability to control the overall distance of travel and speed of suspension movement. With these variables plus the ability to vary spring load adjustment, the device 130 offers an exceptional suspension system for all types of riders and bicycles on various terrains.

Also shown in the embodiments of FIGS. 9-14, a reciprocal bearing system comprising sleeve bearing 142 in conjunction with the slider/retainer bearing member 141. Both the slider/retainer bearing 141 and outer sleeve bearing 142 interact with the piston body or tube 132 to allow telescopically reciprocal motion of the piston tube 132 relative to outer housing 134. As see more distinctly in FIGS. 14-17, the slider/retainer bearing 141 interacts with the first guide means 138 formed on piston body 132 and the second guide means formed in guide sleeve 139 or within the outer housing member 134 alternatively. The slider/retainer bearing 141 performs multiple functions, as it acts to retain the roller bearings 136 separated from one another a slight distance to maintain a relatively frictionless configuration. The slider/retainer bearing 141 may also be grooved, split or provided in sections to effectively vary the amount of lubrication passed through or to these components from the hydraulic fluid disposed within the suspension device or from packed grease within the bearing structures.

The slider/retainer bearing 141 may also be formed so as to retain lubricants such as grease or heavy viscosity fluids to maintain lubricant on the roller bearings 136 as desired. The slider/retainer bearing 141 includes one or more apertures 145 as seen in FIGS. 16 and 17 which allow for the desired number of roller bearing or other bearing means 136 to be retained in a separated fashion while allowing free movement thereof within the apertures. The bearing member 141 may also be provided with sealing structures 147 surrounding each of the retained ball bearings or the like, wherein the sealing structures 147 will help retain a lubricant such as packed grease within the bearing apertures 145. It is also noted that at the top and bottom of bearing member 141, the sealing structures 147 will also act as scrapers to facilitate retention of lubricant within the bearing structure 141 upon movement of the piston tube 132 within outer housing member 134 of the suspension device. To also facilitate retention of a lubricant such as a grease or heavy viscosity fluid, retaining channels 151 may be formed adjacent each of the apertures 145, wherein the lubricant will be caught and redistributed to the roller bearings or the like within bearing apertures 145 by the retaining channels 151. As seen in FIG. 17, the sealing means 147 corresponds to the shape of the guide channels in which the roller bearings are to be housed, so as to provide scraping action within the guide channels for retention of lubricant within the bearing system. With this system seal 143 could alternatively be a wiper or a bellow to shield piston tube 132 from debris.

The bearing member 141 may also be made of low friction materials such as plastic, alloys and composites, such that in conjunction with the roller bearings or the like, will provide a bearing means which creates an essentially frictionless system. The slider/retainer bearing 141 further acts as a load bearing system between the piston body 132 and the guide sleeve 139 or outer housing member 134 or both. The reciprocal sleeve bearing 142 may also be used as another means of load bearing for the piston body 132, and its placement at the top of the outer housing 134 may further facilitate reciprocal movement of the piston body 132 as an alternative if desired. Another aspect of the reciprocal bearing system is found in that the components including the sleeve bearing 142, slider/retain bearing 141, guide sleeve 139 and piston tube 132 may be easily replaced if subsequent wear or damage were to occur without replacing other major components of the suspension device.

As an alternate embodiment, a friction dampening system and lockout system may be provided mechanically within the suspension device. By alternating materials and dimensional characteristics of the sleeve bearing 142 and slider/retainer bearing 141, the action or reciprocating movement of the piston body 132 relative to the outer housing member 134 can be adjusted or inhibited. For example, the reciprocating action of the piston body 132 may be inhibited by changing load angles experienced under power or pedaling positions where the loads encountered are to a much greater extent side loads imposed on the suspension device. Such side loads may be used to create restricted movement under these circumstances while still allowing free operation under shock loads from straighter load angles produced by rough terrain or by adjusting the riders weight to the center of the saddle by simply moving forward on the saddle. As an example, the sleeve bearing 142 positioned between piston body 132 and outer housing member 134 and adjacent to the sealing member 143 may provide the friction dampening system. The sleeve bearing 142 may be made of one of many lightweight materials such as PTFE, bronze alloys or fiberglass reinforced epoxy bearings as well as other alloys of plastics suitable for its function as a bearing and load distribution mechanism. Higher friction materials may be used, and clearances altered to provide a dampening action which can be controlled and predetermined by applied pressures needed to move the piston body 132 in its reciprocating manner depending upon the load angle and pressure induced due to the position of the suspension device.

Figure 18:
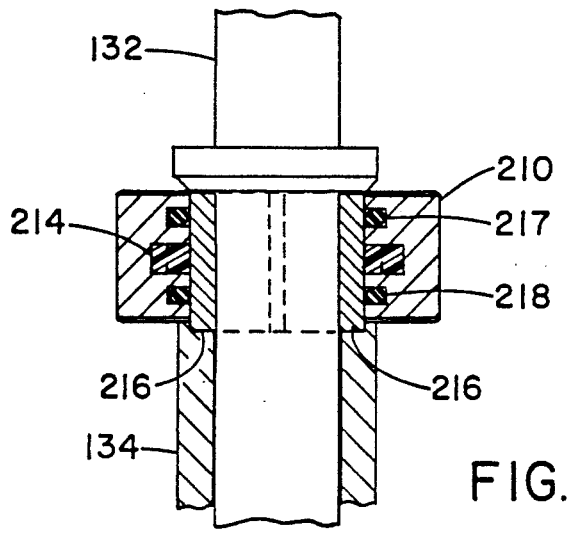
FIG. 18 is an enlarged partial cross-section of a friction dampening and manual lock system associated with the suspension device in an alternate embodiment.
Figure 20:
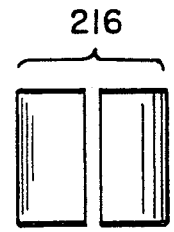
FIG. 20 shows the sleeve bearing utilized in the friction dampening and manual lock system as shown in FIG. 18.
Figure 19:
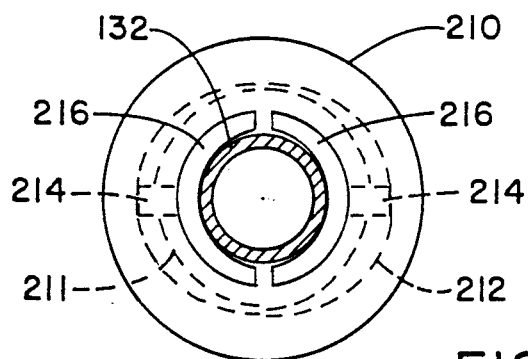
FIG. 19 is an end view of the friction dampening and manual lock system as shown in FIG. 18.

As seen in FIGS. 18-20, an alternate embodiment of the suspension device to provide for friction dampening and to enable manual locking of the suspension system is shown. In this embodiment, a lock cam ring 210 may be provided, wherein cam linkage ring 210 includes two lobes 211 and 212 formed thereon. The two lobes 211 and 212 provide a larger inside diameter and a smaller diameter respectively, which may be used to provide for friction dampening or manual lock of the suspension system. When the large lobes 211 are located at the position of a pressure linkage 214 the piston body 132 is able to slide reciprocally with respect to the outer housing member 134 in an essentially frictionless manner as previously described. When the lock cam ring 210 is rotated such that the small lobe inner diameter 212 is positioned at the location of pressure linkage 99, the cam formed by the small lobe 212 will contact the pressure linkage 214, thereby causing the linkage 214 to close a non-continuous or split sleeve bearing 216 onto the piston body 132. The action of closing the split sleeve bearing 216 onto piston body 132 will act to slow or stop movement of the piston body 132 due to increased friction. As seen in FIG. 20, the sleeve type bearing 216 may be cut in one or more longitudinal positions to allow for the proper amount of dimensional change to provide the friction dampening function.

The system is engaged by turning the lock cam ring 210 by hand or other suitable mechanism, so as to cause the lock cam ring 210 to cause inward movement of the pressure linkage 214. The pressure linkage 214 can be constructed of plastic, urethane rubber or some other semi-resilient member, to enable a constant pressure to be maintained on piston body 132 as desired. As seen in FIG. 18, an upper seal 217 and a lower seal 218 are provided to maintain any lubricant within outer housing member 134 when the lock cam ring 210 is rotated to move the pressure pin 214 into or out of engagement with split bearing sleeve 216. By the use of such a friction dampening system, the bearing systems including slider/retainer bearing 141, roller bearings or the like and first and second guide means could be easily lubricated with grease or other lubricants of heavy viscosity packed around the bearing assemblies upon fabrication. The hydraulic fluid dampening system as previously described would be eliminated in this embodiment. Such a system would provide a very low maintenance suspension device wherein variable rate dampening characteristics could be achieved more simply and cost effectively.

Figure 21:
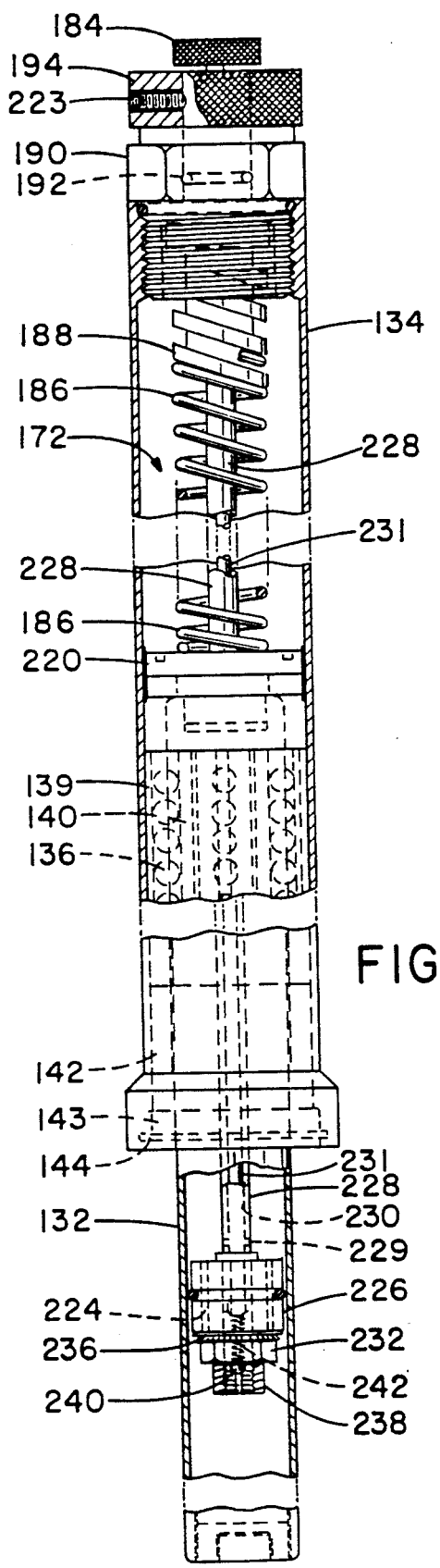
FIG. 21 is a partial cross-sectional view of the alternate embodiment of the invention.
Figure 22:
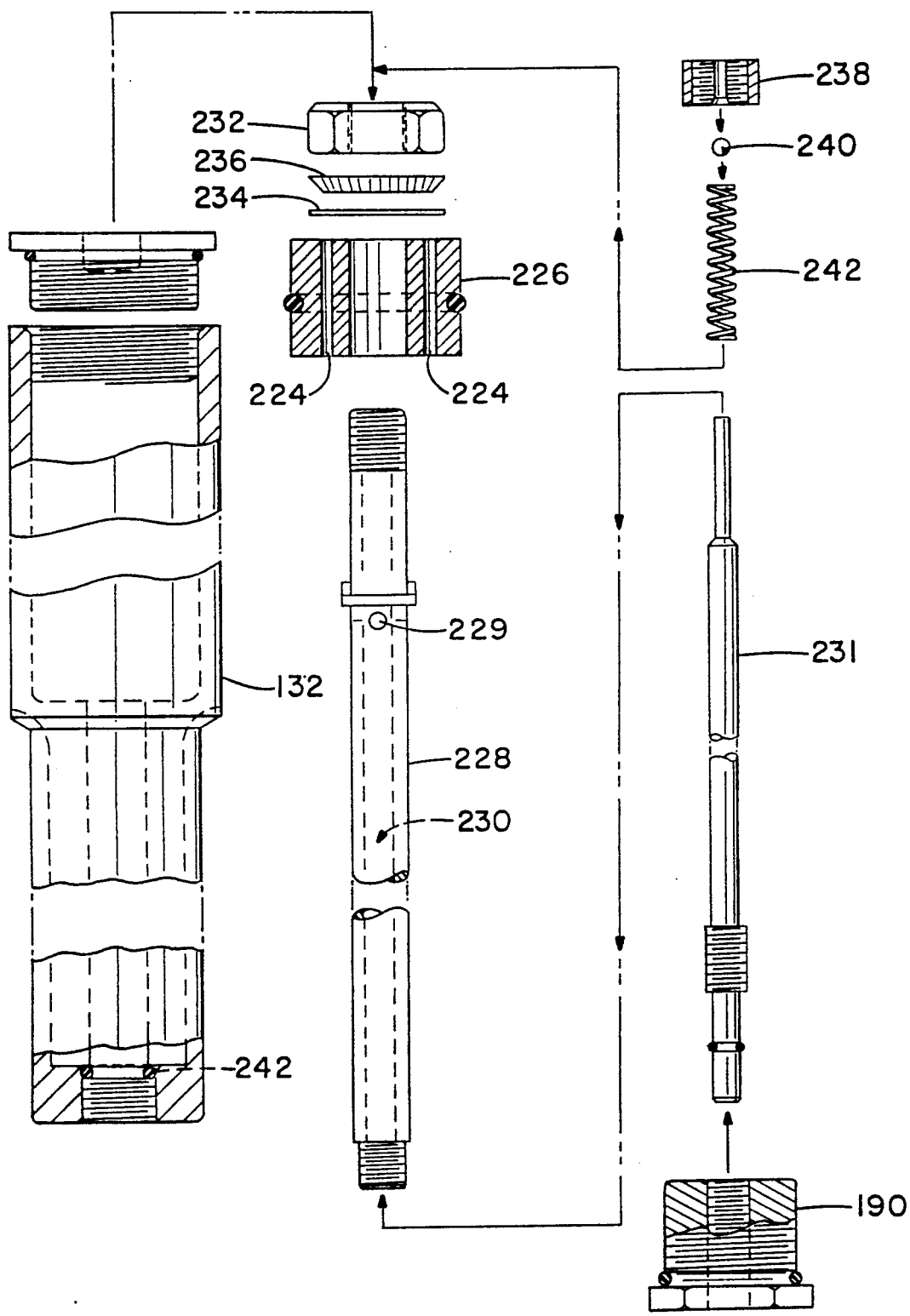
FIG. 22 is a partial exploded view of some components of the suspension device as shown in FIG. 21.

Turning now to FIGS. 21 and 22, an alternate embodiment of the suspension system of the invention is shown. In this embodiment, similar components to those previously described with reference to FIG. 9 have been identified with similar reference numerals. Much of the function of this embodiment of the suspension device is similar to that previously described with reference to FIG. 9, and this embodiment departs from that previously described in the following manner. The piston body 132 again extends outwardly from the housing 134 for mounting to a portion of the bicycle or other vehicle. At the other end of piston body 132 is provided a piston stop 220 which is secured thereto. A resilient bumper means is disposed between the piston body 132 and piston stop 220 so as to cushion any impacts to the piston body 132 at the end of a rebound stroke of the suspension system. At least one bias spring means 186 is provided to act on the piston stop 220, and applies a biasing force directed on piston body 132 outwardly from housing 134. A preload adjustment on spring 186 is provided by adjusting link 188 and its control member 194 which is secured to adjusting link 188 by means of a set screw 223 or the like. Disposed within piston body 132 is a hydraulic fluid such as oil which is adapted to actuate the variable rate dampening system so as to control movement, distance and the speed of compression and rebound strokes of piston body 132. Flow of hydraulic fluid within the hollow tubular piston body 132 is selectively restricted by means of hydraulic ports 224 which are provided as orifices formed through a sub-piston 226 disposed within piston body 132. The sub-piston 226 is coupled with linkage or connector tube 228 which is coupled to the second adjustment member 184 such that connector tube 228 will be rotated therewith. The sub-piston 226 is coupled to the connector tube 228 by means of a connector fastener 232. Disposed between the sub-piston 226 and connector fastener 232 is a bias pressure disk 234 and a belleville spring 236 or similar biasing means. With this construction, variation in the dampening characteristics is achieved by increasing or decreasing the resistance or pressure through the ports 224 relative to the effective hydraulic force acting on the bias pressure disk 234. For example, on a rebound stroke, the ports 224 may be selectively restricted by rotation of the connector tube fastener 232 on its threads in conjunction with connector tube 228. Upon rotation of the connector tube fastener 232, the belleville washer 236 will be compressed or relaxed so as to lessen or broaden the force applied over the bias pressure disk 234. In this way, increased or decreased pressure will be needed to overcome the biasing force on pressure disk 234, which will in turn control the speed of the piston body 132 relative to the outer housing 134 on rebound stroke. It should be understood that the size and temper of the bias pressure disk 234 and spring means 236 are directly related to the resistance applied for dampening, and variations in dampening characteristics may be achieved in selection of these components.

In any of various positions of the suspension device on a bicycle, bump forces or pedalling forces will be applied as compression forces to the piston body 132 as well as bias spring 186. This embodiment allows dampening characteristics on a compression stroke to be controlled and varied effectively. Within the piston body 132, hydraulic fluid will actuate compression valve port 238 so as to act upon a port check ball 240 which in turn applies pressure to a check spring means 242 to produce fluid pressure in the area of valve port 238. As seen more clearly in FIG. 22, the connector tube 228 has disposed therein an adjuster rod 231 extending through channel 230 to a position adjacent offset ports 229 formed in the connector tube 228. The adjuster rod 231 is threadedly coupled to control means 184, to enable rotation of the control means to adjust the position of the rod 231 within connector tube 228. The offset ports 229 within the connector tube 228 will be completely open upon adjustment of the adjuster rod 231 toward control member 184, but may be moved within channel 230 so as to extend upwardly toward ports 229. Upon rotation of the control member 184 in this manner, the preload on check spring 242 will correspondingly increase, and the offset ports 229 will begin to partially close. Full extension of adjuster rod 231 will act to seat check ball 240 into valve port 238, and will close offset ports 229 to facilitate complete hydraulic lockout of piston body movement. The end of adjuster rod 231 acts to push the check ball 240 forcefully into valve port 238 to achieve lockout. Optionally, a bypass valve could limit hydraulic lockout if complete lockout is not desired, wherein such a bypass valve could be provided as an orifice in the connector tube 228 downstream of valve port 238.

It is also mentioned with respect to this embodiment that the connector tube 228 passing through piston stop 220 may be sealed at 242 within the piston body 132. If the seal 242 is utilized, hydraulic dampening will be the only function of the hydraulic fluid within the suspension device, wherein the bearing means of the suspension device may then use a heavy viscosity lubricant such as grease which is packed therein. Such lubrication grease will then be retained at the location of the bearings by means of seal 242, which maybe similar to the embodiment using a gas spring as previously described. If the seal 242 is not installed, hydraulic fluid will pass through the piston body 132 where sufficient clearance may be provided to allow a hydraulic oil or the like to provide sufficient lubricant to the bearing assembly.

Figure 23:
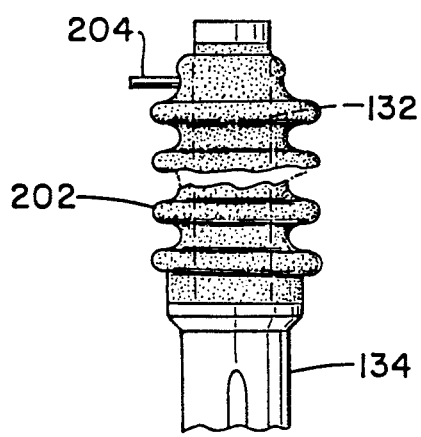
FIG. 23 shows an alternate embodiment of the suspension device using an external protective boot or external air spring associated therewith.

Turning to FIG. 23, there is shown an embodiment of the suspension device using a flexible bellows or boot 202 which is adapted to extend about the exposed portion of piston tube 132 extending from housing 134. The boot 202 will protect the piston tube 132 against damage and will prevent the ingress of dirt or other debris. The boot 202 may simply act as a protection for the piston tube 132, or could be a heavier member which is reinforced with an external valve 204 to create an external gas spring which could be used separately or in conjunction with an internal spring member within the suspension device. In such an embodiment, the external gas spring 202 preload could be adjusted by variation of pressure therein via valve 204. It should also be recognized that the boot or external spring 202 could be mounted to the outer housing 134 at its opposite end from piston body 132 to provide similar bias spring characteristics.

Figure 24:
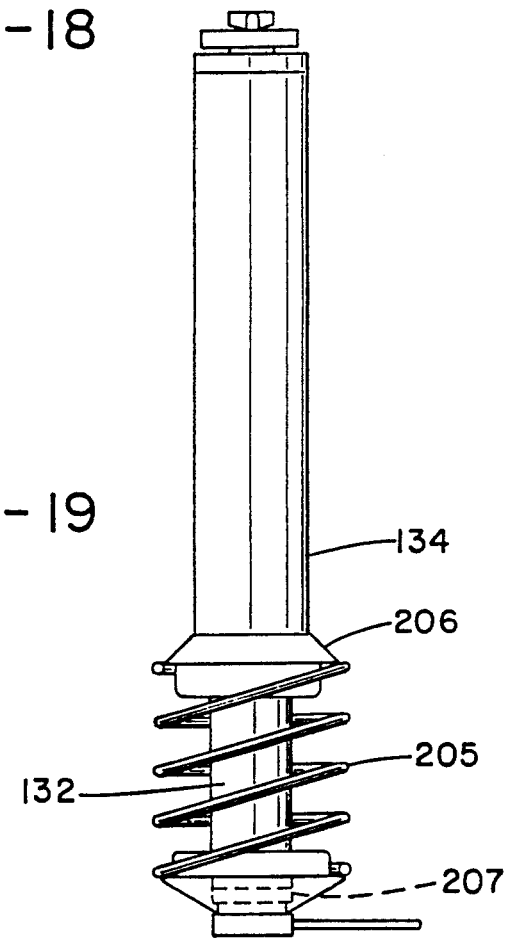
FIG. 24 shows an alternate embodiment of the suspension device including an external bias spring associated therewith.

Alternatively, as seen in FIG. 24 an external bias spring 205 may be used to provide a bias force against compression of the suspension device. The external spring 205 is secured on housing 134 by means of a split or two-piece collar 206, which seats against a shoulder portion formed on housing 134. Similarly, a split collar 207 may be mounted on the exposed end of the piston tube 132 to retain the external bias spring 205, or alternatively the spring could stop against a portion of the bicycle on which the suspension device is mounted such as the fork mount or seat mount locations. By the use of an external spring means such as an external gas spring 202 or mechanical spring member 205, the need for an internal spring will be eliminated so as to allow a shorter and more compact design for the suspension device as the length of housing 134 may be shortened.

Figure 25:
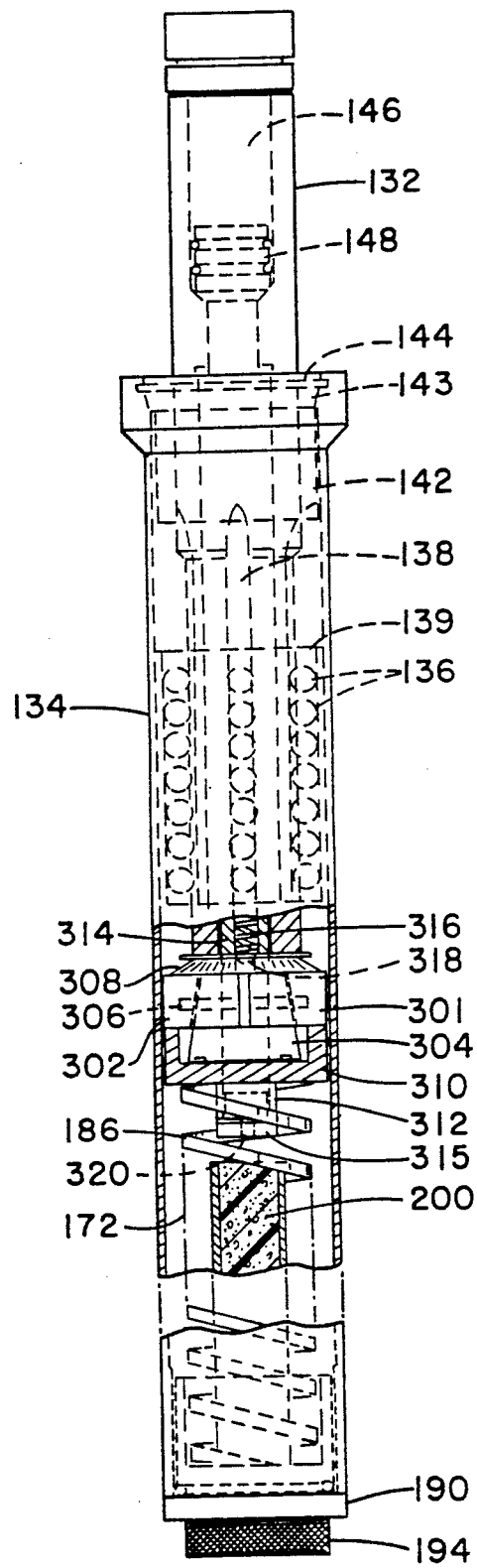
FIG. 25 is a partial cross-sectional view of the alternate embodiment of the invention.
Figure 26:
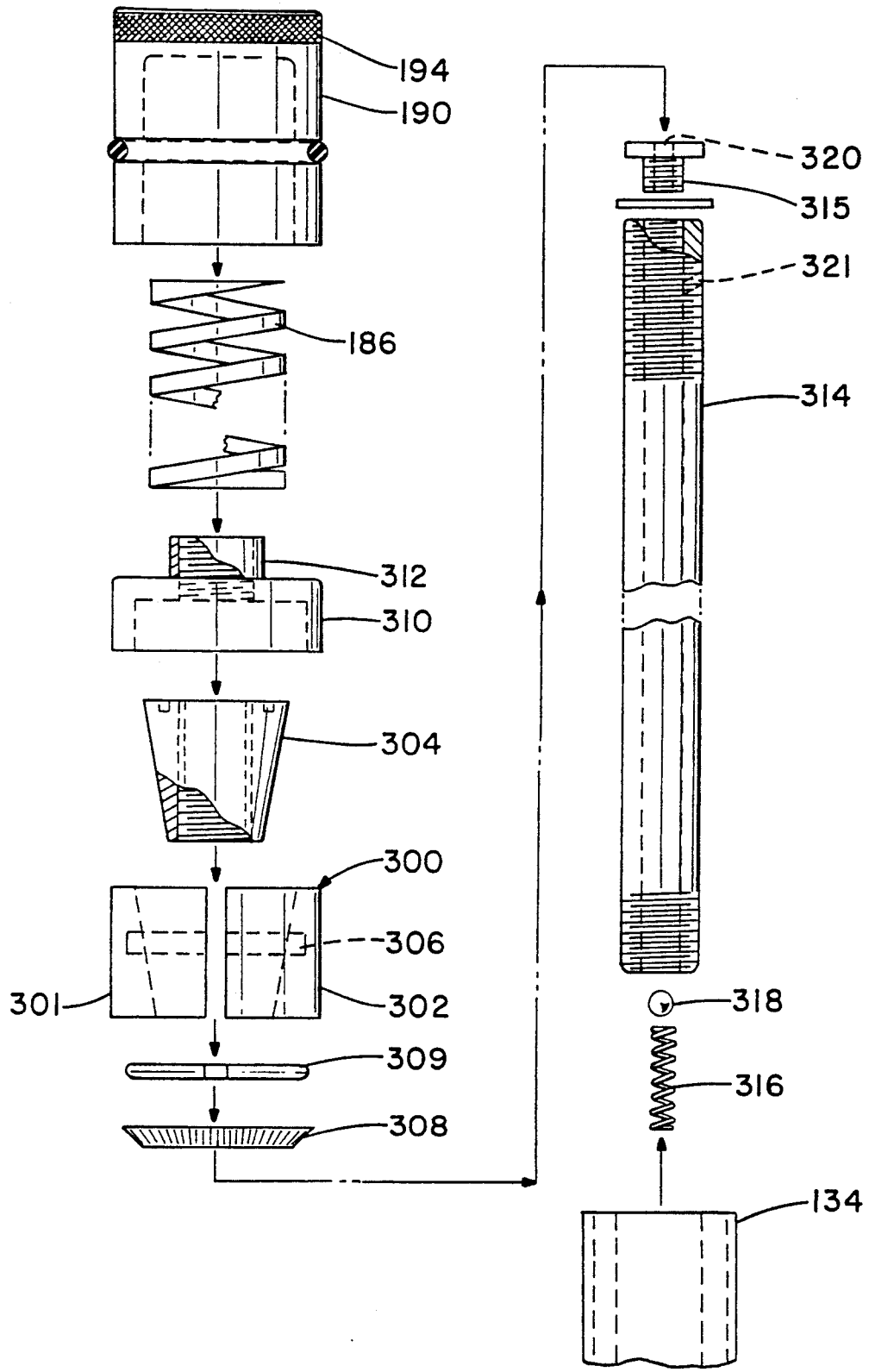
FIG. 26 is a partial exploded view of some components of the suspension device as shown in FIG. 21.

Turning now to FIGS. 25 and 26, another embodiment showing a variation of a friction dampening system will be described. In this embodiment, similar structures to the embodiment as described in FIG. 9 are again indicated by similar reference numerals. A friction dampening system of this embodiment comprises a friction member 300 which may be formed as a multipiece expanding friction piston. The friction piston 300 as more distinctly seen in FIG. 26 may be cut longitudinally along its cylindrical axis to provide two halves 301 and 302, which allow for expansion of the piston halves relatively to one another. On the internal dimensions of the friction piston halves 301 and 302, is formed a conical section adapted to allow partial contact with a cone shaped internal wedge 304. The friction piston halves 301 and 302 also are adapted to retain a resilient bias pressure ring 306 which in turn will maintain pressure of the piston halves 301 and 302 on the internal cylindrical surface of the outer housing member 134. By relative movement of the piston halves 301 and 302 toward or away from one another, variation in the friction between the friction piston 300 and outer housing member 134 may be produced to provide variable dampening characteristics. A belleville washer 308 or similar means coupled with the friction piston 300 by means of a flat washer 309 may be utilized to provide another means to apply pressure to piston halves 301 and 302. The belleville washer 308 will provide a constant pressure towards the compression chamber 172 along with pressure ring 306, which will be directly relative to the drag of the friction pistons 301 and 302 within the outer housing member 134. This force is proportionally equal to the position of the internal wedge 304, which is determined by a retainer cup 310 for the internal wedge 304. The retainer cup 310 is recessed to allow the inner wedge 304 to be partially covered at a large end thereof while having an outward extending portion which will coact with friction piston halves 301 and 302. The retainer cup 310 is coupled to a bias spring member 186 which may be positioned within an end cap 190 or outer housing member 134. The spring member 186 is secured within the end cap 190 and at its opposite end to retainer cup 310 by means of an outwardly extending collar 312. The collar 312 is adapted to be secured to linkage tube 314 which extends through the friction dampening assembly and is coupled to collar 312 by a securing means 315 from its structure, rotation of control knob 194 will in turn cause rotation of bias spring member 186 and the retainer cup 312 so as to adjust the position of internal wedge 310 relative to friction piston halves 301 and 302. By moving the inner wedge 304, it should be evident that variable friction may be achieved between the friction piston halves 301 and 302 and internal surface of outer housing member 134.

It is also possible in this embodiment of the invention to provide a shock isolation system which can be used in conjunction with a hydraulic fluid similar to that previously described. As seen in FIG. 25, a hydraulic fluid may be positioned within compression chamber 172 so as to coact with the friction dampening system described. A bladder 200 such as a closed cell sponge, may be positioned in the center of the bias spring member 186. A bladder/accumulator system similar to that previously described will allow hydraulic fluid within compression chamber 172 to migrate through linkage tube 314 so as to coact with a pressure chamber 146 housing an accumulator piston 148 in the piston tube 132 as previously described. The adjustable end cap 190 is threaded so as to engage with threads within the end of outer housing member 134 so as to allow rotation of the end cup 190 relative to outer housing member 134 so as to provide an increase or decrease of the preload on bias spring member 186 and simultaneously the hydraulic preload provided by the bladder 200 in association with pressure chamber 146 and accumulator piston 148. Further, hydraulic fluid flow can be regulated on the return or rebound stroke by altering dimensions or form of the friction piston member to selectively restrict hydraulic fluid flow therearound. The linkage rod 314 may also have hydraulic ports and a bias spring member 316 and check ball 318 disposed therein, which are adapted to coact with an exhaust port 320 provided in linkage rod 314 so as to restrict hydraulic fluid flow around the friction piston of this assembly. A bypass port 321 may be provided for circulation of hydraulic fluid on a rebound stroke. It should be evident that the use of a friction piston member in association with hydraulic fluid dampening allows the user to vary dampening characteristics significantly by only slight movement of the adjustment knob 194 for modification of the friction dampening characteristics of the system.

Figure 27:
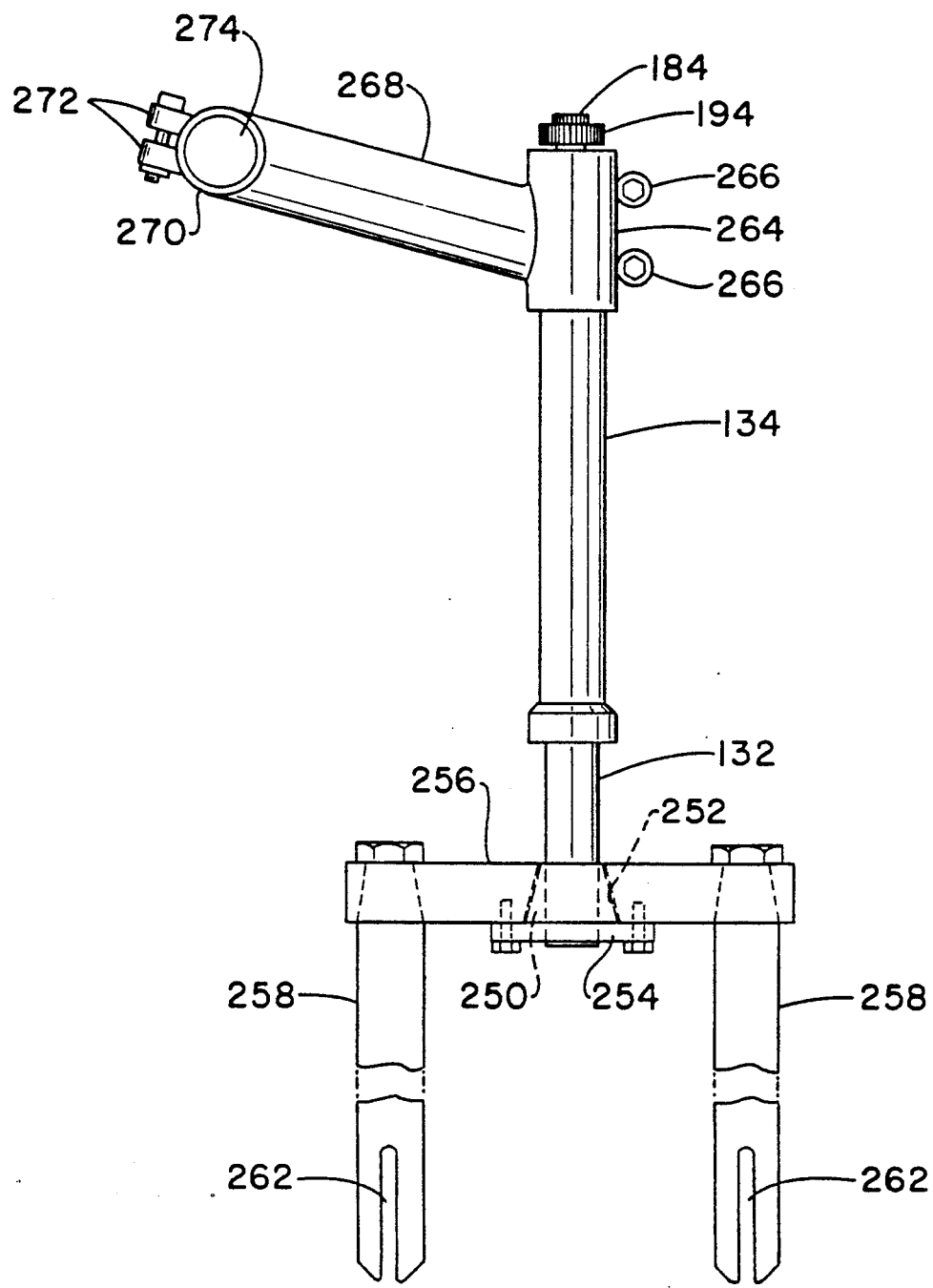
FIG. 27 shows the suspension device of the invention mounted at the front fork locations of a bicycle.

Turning now to FIG. 27, the mounting of a suspension device in accordance with the invention will be described in more detail. As seen in this figure, the suspension device of the invention is mounted at the front fork location of the bicycle to provide suspension to the front wheel thereof. Although any of the embodiments of the invention may be utilized at this location to provide suspension, the description will utilized the embodiment of FIG. 9 as an example. The outwardly extending portion of the piston tube or body portion 132 is adapted to be held in place the use of a tapered split collar wedge 250 which tightens into a tapered bore 252. The piston tube 132 is held in the tapered split collar 250 by means of a retainer ring 254 and the apparatus tightens into the crown assembly 256 of the front forks of the bicycle by means of tapered bore 252 and collar 250. From the crown assembly 256, extend lower fork leg 258 for attaching an axle 260 of the bicycle wheel. Multiple positions for axle mounting may be provided by a drop mount structure 262 if desired. It should also be recognized that the piston tube 132 could be welded or pressure fit into the crown assembly 256 to reduce manufacturing cost. As another alternative, the suspension device of the invention may be utilized in a double shock system wherein a suspension device will be employed in place of each fork leg 258 of the front fork assembly. Such a design would employ the alignment system to reduce fork flex by eliminating rotation movement of conventional sliding leg systems. Similarly, the use of cross bracing in current designs would be eliminated, and the system could be used with or without another suspension device extending through a portion of the bicycle frame to the handlebar of the bicycle. For use of the suspension device at the front fork location, steering pivot bearings (not shown) may be positioned about the outer housing 134 to facilitate rotation of fork and handlebars for steering of the bicycle.

At the opposite end of the suspension device as seen in FIG. 27, a split tube 264 may be mounted on the outer housing 134 by means of clamp assemblies 266. The split tube 264 may be welded to a connecting tube 268 which in turn is welded to a split tube 270 sized for handlebars with a clamping assembly 272. Handlebars 274 may then be secured within split tube 270 so as to connect the handlebars to the steering suspension device accordingly. As seen in FIG. 27, the control knobs 184 and 194 which are adapted to adjust spring preload and dampening characteristics of the suspension device are exposed at the top end of the steering column for easy adjustment during riding of the bicycle.

Figure 28:
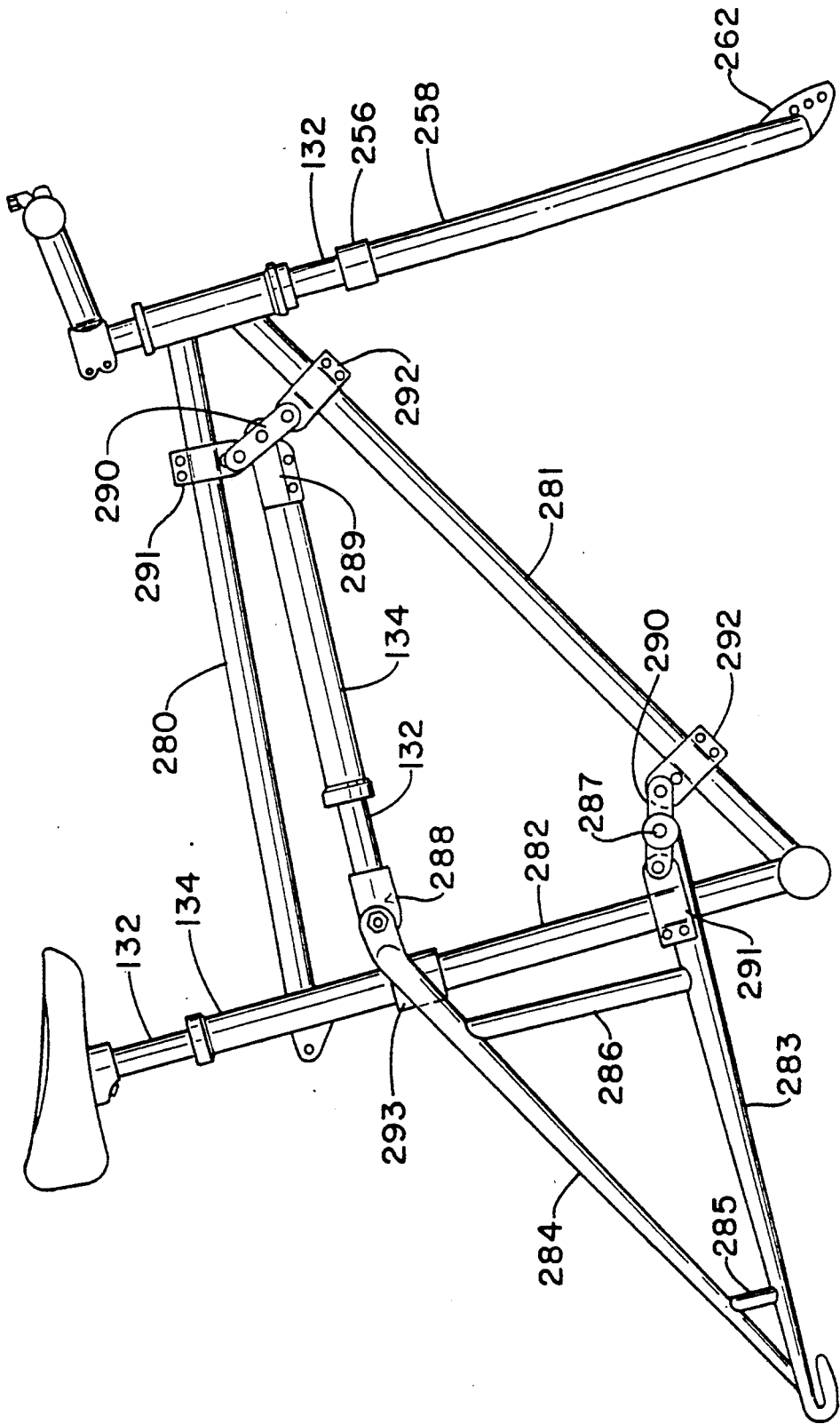
FIGS. 28 and 29 show various embodiments of a full suspension system for a bicycle including use of the suspension device at the front fork and seat locations and in conjunction with a sub-frame to allow suspension of the back wheel of the bicycle.

Turning to FIG. 28, a fully suspended bicycle frame employing the suspension devices of the invention is shown. To accomplish full suspension of the bicycle, a front frame consisting of an upper tube 280, and lower tube 281 and a seat tube 282 are provided in a welded construction. A rear sub-frame member comprising a pivot arm 283, a control arm 284, a rear support 285 and a front support 286 is adapted to be pivotally coupled to the front frame construction. The rear sub-frame pivots at pivot arm axle 287, with the top end link of the sub-frame being connected to a suspension device via pivot link 288. The top end link of the sub-frame may also extend about an external guide sleeve or block 293 which is secured to seat tube 282. The guide block 293 will provide rigidity to the system along with the suspension device and reduce flex of the sub-frame as desired. As seen in this figure, the outwardly extending piston post 132 of the suspension device is coupled to the pivot link 288. The opposite end of the suspension device or housing 134 is coupled to a connecting link 289. Both connecting links 288 and 289 may be collar type clamp assemblies using pinch bolts and apertures for mounting the assembly pivotably. The connecting link 289 is secured to a support link 290, which in turn is secured to an upper clamp link 291 and lower clamp link 292. The upper and lower clamp links 291 and 292 provide mounting points for the support link to the upper and lower frame members 280 and 281 respectively. A similar configuration is used to secure pivot arm 283 to the pivot arm axle 287 wherein the use of thrust washers and spacer bushings may be provided to separate the support link of the mounting arrangement so as to allow outer mounting of the pivot arm 283. The arrangement of providing the sub-frame in pivotable relationship to the main or front frame of the bicycle by means of a coupling to a suspension device mounted thereon will provide suspension characteristics for the rear sub-frame and rear tire mounted thereto. It is also seen in FIG. 22 that the use of a suspension device wherein the outwardly extending piston post provides the mounting arrangement for the seat of the bicycle as well as mounting of the front fork structure as previously described will provide a fully suspended bicycle as desired. This embodiment allows retrofitting of a bicycle with the suspension devices of the invention for full suspension thereof.

Figure 29:
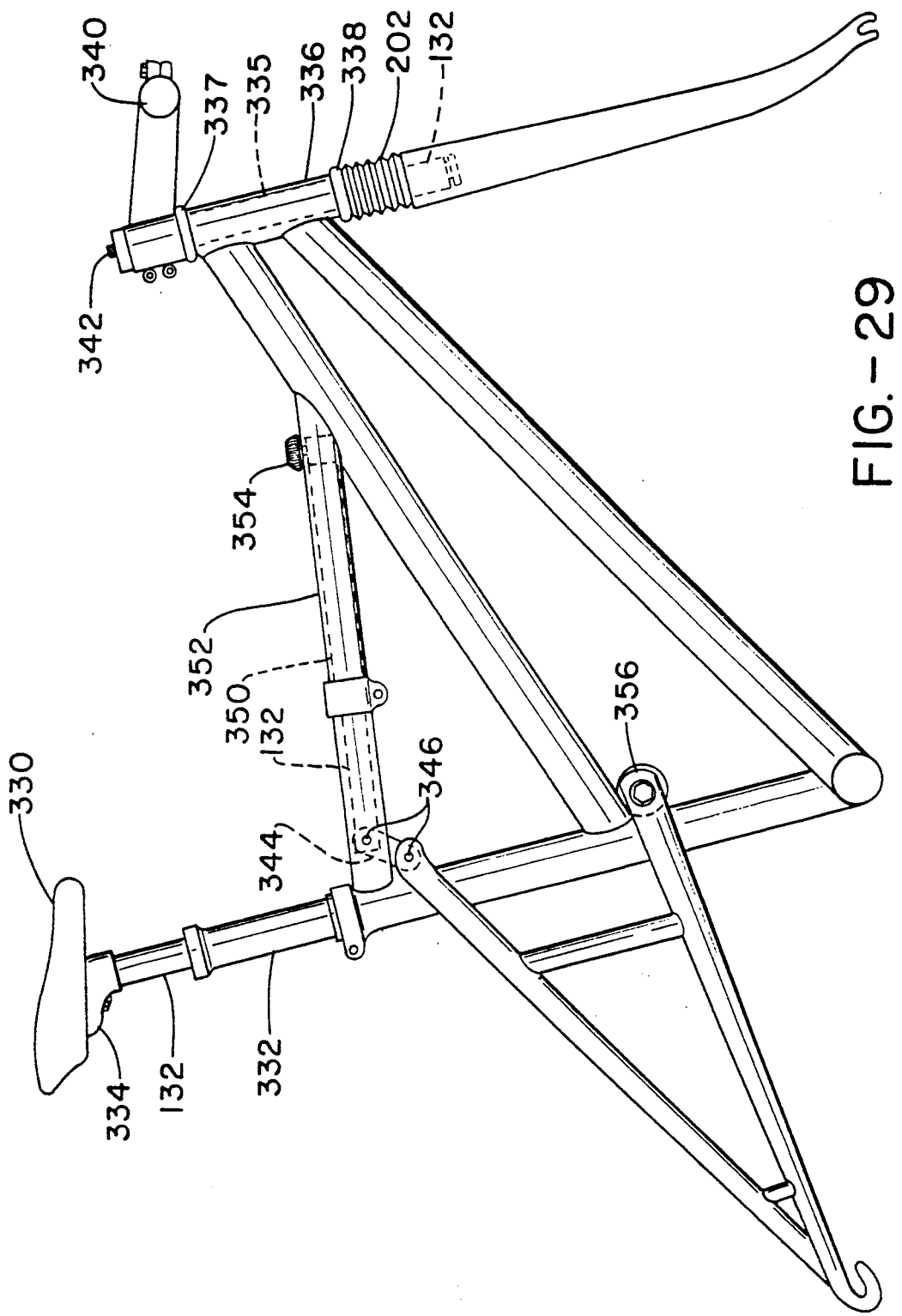

Turning now to FIG. 29, an alternate embodiment of a fully suspended bicycle frame employing the suspension device of the invention at various locations on a bicycle is shown. Again, three function specific areas of a bicycle are provided with suspension characteristics, but in an original equipment manufactured bicycle frame assembly. A first location at which suspension is desired is the seat 330, wherein a suspension device 332 is housed within a frame portion of the bicycle with a piston body portion 132 extending outwardly therefrom. A mount adaptor 334 for a bicycle saddle with a standard angle adjuster maybe provided for mounting the saddle 330 thereon. It is also desired to provide suspension at the front fork section of the bicycle, wherein a suspension device 335 is mounted within a steerer tube 336 of the bicycle. The suspension device 335 is enabled to rotate within steerer tube 336 by means of upper and lower roller bearing sets 337 and 338, while engaging the suspension device 335 within the steerer tube 336 by threaded engagement of the outer housing of suspension device 335 therewith. A handlebar strut 340 may be mounted on an exposed end of the suspension device 335 by means of a clamping arrangement or the like. The outwardly extending piston tube 132 may be protected by a boot or external air spring 202 as previously described. Adjustment knobs 342 are provided at the upper end of the suspension device for easy control by the rider to adjust dampening and preload characteristics of the suspension device.

It is also desirable to suspend the back wheel of the bicycle, wherein a sub-frame will support the rear axle of the bicycle. Shocks to the back wheel will be isolated via a pivot link 344 coupled to sub-frame having pivot point 346, wherein the pivot link 344 is adapted to coact with an extending piston tube 132 of a suspension device 350. The suspension device 350 is adapted to be disposed within a top front frame tube 352 of the bicycle, with an accessible adjustment control member 354 coupled thereto by a suitable gear mechanism to provide for dampening and preload adjustment. A rear pivot point 356 of the sub-frame may comprise sleeve type bushings or roller type bearings to achieve a desired rigidity for different applications. It should be evident in the fully suspended bicycle frame as described, the shock isolation system of the invention may provide the desired suspension characteristics at a variety of locations by the ability to mount the shock isolation system at any angle or position and the ability to maintain constant operating characteristics while providing accessible adjustment means.

This embodiment can be integrally designed at OEM level so as to allow the frame geometry to be adjusted to enhance or compliment the shock isolation system. In this application the 2-4" of suspension travel alters the heights of the front portion of the bicycle and alters handling characteristics to a slight degree. For example, the steerer tube 336 height may be altered relative to frame member 352 to compensate for any height difference incurred. Similarly, rear sub-frame member can be altered relative to the rear axle and pivot link 344 and pivot point 346. Alternatively, the position of the shock isolation system in frame tube 352 can be altered and clamped using a clamp structure much like the clamps at the handle bar and set tube which allow slidable movement within to allow adjustment of the height of portions of the bicycle. Similarly, the rear pivot point 356 could be adjusted by provision of a multiplicity of mounting holes provided on the main frame.

It is seen from the preferred embodiments of the invention as described, that the shock isolation mounting system of the invention provides a bicycle suspension system which may be incorporated or retrofit into an existing bicycle for the mounting of the seat, handle bars or the like. The system affords a compact and light weight design an enhances the comfort and versatility of the bicycle on which it is utilized. The shock isolation device provides a totally enclosed shock absorbing mechanism to prevent exposure to atmosphere conditions and also lubricates the slidable portions thereof to extend the useful and functional life of the system. The system provides a variable rate progressive dampening system to control the stroke of the device according to the speed and distance of each stroke and provides an adjustable spring preload to accommodate the riders with different weights without effecting the travel and shock absorbing characteristics of the system. The system is extremely durable as the normal side loads imposed on such a system are distributed to linear bearing guides which are strongly supported to accommodate these loads.

While the invention has been described in terms of preferred embodiments thereof, those skilled in the art will recognize that the invention may be practiced with various changes and modifications in the construction. Such variations and modifications can be made in the foregoing preferred embodiments without departing from the spirit and scope of the invention as set forth in the appended claims.

What is claimed is:

1. A shock isolation system for a vehicle having a main frame associated therewith, the shock isolation system comprising:
   an outer housing member secured to said main frame of said vehicle;
   a piston assembly slidably disposed within said outer housing member with at least a part of said piston assembly extending outwardly from said outer housing member;
   first guide means associated with said piston assembly and second guide means associated with said outer housing member which coact with said first guide means, and bearing means disposed in said coacting first and second guide means which allow at least relative linear movement between said piston assembly and said outer housing member and to limit rotational movement of said piston assembly relative to said outer housing member;
   biasing means acting between said piston assembly and said outer housing member so as to bias said piston assembly to an extended position with respect to said outer housing member;
   a hydraulic fluid disposed within said housing member;
   and means to allow said hydraulic fluid to flow past said piston assembly to provide dampening of movement of said piston assembly on compression and rebound motions thereof.

2. A shock isolation system as in claim 1, wherein a lubricant is provided and retained within said outer housing member to provide lubrication to said bearing means so as to reduce friction upon relative linear movement of said piston assembly and said outer housing member.

3. A shock isolation system as in claim 1, wherein said bearing means are sealed so as to prevent ingress of contamination.

4. A shock isolation system as in claim 1, wherein said piston assembly is tubular in configuration, wherein a pressure chamber is formed on the interior of said piston assembly and an accumulator piston assembly is disposed and sealed within said piston assembly to form said pressure chamber.

5. The shock isolation system as in claim 4, wherein said pressure chamber is formed between said accumulator piston and a valve cap disposed at the end of said tubular piston body portion, wherein said pressure chamber includes a biasing means acting on said accumulator piston, and said valve cap allows variation of the bias pressure imposed by said biasing means within said pressure chamber.

6. A shock isolation system as in claim 5, wherein said bias means disposed within said pressure chamber is an inert gas charge within said pressure chamber.

7. A shock isolation system as in claim 5, wherein said bias means disposed within said pressure chamber is a compression spring acting between said valve cap and said accumulator piston.

8. A shock isolation system as in claim 1, wherein said bearing means are a plurality of roller bearings retained within said first and second guide means, and means are provided for maintaining said plurality of roller bearings in spaced apart relationship.

9. A shock isolation system as in claim 1, wherein at least one aperture is formed in said piston assembly and movement of said piston assembly within said outer housing member will cause said hydraulic fluid to flow through said aperture, and a restricting means is provided in association with said aperture to selectively vary flow of said hydraulic fluid through said aperture so as to dampen movement of said piston assembly.

10. A shock isolation system as in claim 9, wherein said restricting means comprising at least one valve disk which coacts with said aperture in said piston assembly so as to allow said hydraulic fluid to progressively flow past said at least one valve disk during movement of said piston assembly within said outer housing member.

11. A shock isolation system as in claim 10, wherein said at least one valve disk has at least one aperture therein and said at least one valve disk coacts with a linkage means which extends outwardly from said outer housing member to allow external adjustment of the position of said at least one valve disk relative to said piston assembly to modify the flow of said hydraulic fluid through said aperture of said piston assembly.

12. A shock isolation system as in claim 10, wherein said at least one valve disk has a first surface positioned adjacent to said piston assembly and said aperture therein, wherein said first surface is a serrated surface which restricts the flow of said hydraulic fluid to dampen movement of said piston assembly.

13. A shock isolation system as in claim 10, wherein said at least one valve disk includes at least one aperture therein which may be selectively aligned with said aperture in said piston assembly to allow selective variation of the flow of hydraulic fluid through said aperture in said piston assembly.

14. A shock isolation system as in claim 13, wherein said at least one aperture in said at least one valve disk is a tapered aperture which may be selectively aligned with said aperture in said piston assembly to allow selective variation of the flow of hydraulic fluid through said aperture in said piston assembly.

15. A shock isolation system as in claim 1, wherein at least one sleeve bearing is associated with said outer housing member, wherein said sleeve bearing acts on said piston assembly to allow linear movement of said piston body portion.

16. A shock isolation system as in claim 4, wherein said pressure chamber coacts with a second hydraulic valve means acting to restrict hydraulic fluid flow to and from said pressure chamber during compression and rebound strokes of said piston assembly.

17. A shock isolation system as in claim 1, wherein said biasing means comprises a mechanical spring, and including adjustment means acting on said spring to apply a predetermined force on said spring for adjusting the preload on said spring, said adjustment means being manually adjustable from the exterior of aid outer housing member.

18. A shock isolation system as in claim 1, wherein said biasing means is an inert gas charge formed within said outer housing member adjacent said piston assembly; wherein said gas charge will provide a biasing force acting upon said piston assembly, and valve means are provided for varying said gas charge externally of said outer housing member.

19. A shock isolation system for a bicycle or other vehicle having a main frame associated therewith, the shock isolation system comprising;
an outer housing member secured to said main frame of said vehicle;
a piston assembly slidably disposed within said outer housing member with at least a portion of said piston assembly extending outwardly from said outer housing member;
an insert having first guide means formed therein which is positioned within said piston assembly, and a second guide means associated with said outer housing member which coacts with said first guide means, and bearing means disposed in said coacting first and second guide means which allow at least relative linear movement between said piston assembly and said outer housing member and to limit rotational movement of said piston member relative to said outer housing member; and
a bias pressure means acting on said piston assembly so as to bias said piston assembly to an extended position with respect to said outer housing member.

20. A shock isolation system as in claim 19, wherein said second guide means is formed in a guide sleeve positioned within said outer housing member.

21. A shock isolation system as in claim 19, wherein said second guide means is formed in a second insert associated with said outer housing member.

22. A shock isolation system as in claim 19, wherein said first insert coacts with at least one resilient member positioned between said first insert and said piston assembly, with said at least one resilient member being selectively movable to preload said bearing means housed therein.

23. A shock isolation system for a vehicle having a main frame associated therewith, the shock isolation system comprising;
an outer housing member secured to said main frame of said vehicle;
a piston assembly slidably disposed within said outer housing member with at least a part of said piston assembly extending outwardly from said outer housing member and adapted to mount a portion of said vehicle thereon;
at least one first guide means associated with said piston assembly and at least one second guide means associated with said outer housing member which coact with said first guide means, and bearing means disposed in said coacting at least one first guide means and at least one second guide means which allow at least relative linear movement between said piston assembly and said outer housing member and to limit rotational movement of said piston assembly relative to said outer housing member;
biasing pressure means acting between said piston assembly and said outer housing member so as to bias said piston assembly to an extended position with respect to said outer housing member;
dampening means acting on said piston assembly to control movement of said piston assembly on compression and rebound strokes thereof, and including means for varying the amount of dampening provided by said dampening means, with said means for varying being accessible at an external location of said outer housing member.

24. A shock isolation system as in claim 23, wherein said dampening means is provided by said piston assembly which has a portion thereof dimensioned so as to create friction with said outer housing member, wherein the dimension of said portion of said piston assembly is selectively variable to adjust the amount of friction created and to vary the dampening of linear movement of said piston assembly relative to the amount of said friction created.

25. A shock isolation system as in claim 24, wherein said portion of said piston assembly is formed to accept a resilient member associated with a friction ring which coacts with said outer housing member to create a dampening friction which acts to restrict linear movement of said piston assembly relative to said outer housing member.

26. A shock isolation system as in claim 25, wherein said portion of said piston assembly is formed from at least two sections, each of which has a tapered aperture dimensioned to accept said resilient member dimensioned as a tapered form so as to allow relative movement of said resilient member with respect to said at least two sections within said tapered aperture allowing adjustment of said at least two sections relative to one another.

27. A shock isolation system as in claim 26, wherein said tapered form of said resilient member is variable so as to alter the force induced on said resilient member associated with said friction ring so as to allow variable friction dampening of said piston assembly.

28. A shock isolation system as in claim 27, wherein said variable tapered form is associated with a linkage extending outwardly form said outer housing member so as to allow said friction dampening to be adjusted externally.

29. A shock isolation system as in claim 23, wherein a sleeve bearing is disposed within said outer housing about said outwardly extending piston body portion, such that said piston body portion coacts with said sleeve bearing to allow reciprocal linear movement of said piston body.

30. A shock isolation system as in claim 29, wherein said dampening means is provided by said sleeve bearing which is formed from at least two sections, wherein said sections are movable relative to one another to vary the cylindrical dimension provided by said sleeve by applied lateral forces to said sections so as to apply friction to said piston body portion relative to said lateral forces applied by means of said sleeve bearing so as to dampen linear movement of said piston body relative to said outer housing, wherein said lateral force on said sleeve bearing is provided by a linkage means provided externally of said outer housing member, wherein said linkage means may be selectively positioned to impart desired lateral forces on said sections of said sleeve bearing.

31. A shock isolation system for a bicycle or other vehicle having a main frame associated therewith, the shock isolation system comprising:
an outer housing member secured to said main frame of said vehicle;
a piston assembly slidably disposed within said outer housing member with at least a part of said piston assembly extending outwardly from said outer housing member;
first guide means associated with said piston assembly and second guide means associated with said outer housing member which coact with said first guide means, and bearing means disposed in said coacting first and second guide means which allow at least relative linear movement between said piston assembly and said outer housing member and to limit rational movement of said piston assembly relative to said outer housing member;
lubricant means disposed and retained within said outer housing to provide lubrication to said bearing means within said first and second guides means acting between said piston assembly and said outer housing member and means to bias said piston assembly to an extended position with respect to said outer housing member.

32. A shock isolation system as in claim 31, wherein, sealing means are provided to seal said bearing means, and said lubricant means is provided as a lubricant packed around said bearing means and retained in association with said bearing means by said sealing means.

33. A shock isolation system as in claim 31, further comprising, dampening means acting on said piston assembly, wherein, said piston assembly is tubular in configuration, and a sub-piston is disposed within said piston assembly having at least one port extending therethrough and including a bias pressure disk and a biasing means acting on said bias pressure disk which acts to selectively restrict said at least one port, wherein a hydraulic fluid is disposed within said piston assembly and flow of said hydraulic fluid through said at least one port is selectively restricted by said bias pressure disk in association with said biasing means to control movement, distance, and the speed of compression in rebound strokes of said piston assembly.

34. A shock isolation system as in claim 33, wherein said sub-piston is coupled to a connector tube which is in turn coupled to an external adjustment means which will allow said connector tube to be rotated relative to sub-piston, said connector tube acting on said biasing means associated with said bias pressure disk to selectively restrict flow of said hydraulic fluid through said at least one port.

35. A shock isolation system as in claim 33, wherein, said connector tube has disposed therein an adjuster rod extending therethrough to a position adjacent at least one offset port formed in said connector tube, wherein said adjuster rod is coupled to an external control means to enable repositioning of said adjuster rod within said connector tube to selectively open, partially close or completely close said at least one offset port, wherein upon the occurrence of a compression stroke of said piston assembly relative to said outer housing member, said hydraulic fluid will be made to selectively flow through said connector tube and said at least one offset port to control movement, distance, and the speed of a compression stroke of said piston assembly.

36. A shock isolation system as in claim 35, wherein, a check ball and check spring are provided in association with said adjuster rod and a valve port associated with said connector tube, wherein said adjuster rod can be adjusted to seat said check ball into said valve port and to close said offset port for a complete hydraulic lockout of movement of said piston assembly within said outer housing member.

37. A shock isolation system as in claim 31, wherein, said lubricant means is a grease retained at the location of said bearing means by a sealing means, and said means to bias said piston assembly is an inert gas charge formed within said outer housing member adjacent said piston assembly, wherein said gas charge will provide a biasing force acting upon said piston assembly.

* * * * *